US012024861B2

(12) United States Patent
Teranishi et al.

(10) Patent No.: US 12,024,861 B2
(45) Date of Patent: Jul. 2, 2024

(54) WORK VEHICLE

(71) Applicant: KOMATSU LTD., Tokyo (JP)

(72) Inventors: Yuichi Teranishi, Tokyo (JP); Yuita Takenaka, Tokyo (JP)

(73) Assignee: KOMATSU LTD., Tokyo (JP)

( * ) Notice: Subject to any disclaimer, the term of this patent is extended or adjusted under 35 U.S.C. 154(b) by 902 days.

(21) Appl. No.: 17/045,546

(22) PCT Filed: Jul. 16, 2019

(86) PCT No.: PCT/JP2019/027923
§ 371 (c)(1),
(2) Date: Oct. 6, 2020

(87) PCT Pub. No.: WO2020/036035
PCT Pub. Date: Feb. 20, 2020

(65) Prior Publication Data
US 2021/0156118 A1 May 27, 2021

(30) Foreign Application Priority Data

Aug. 13, 2018 (JP) ................................ 2018-152452

(51) Int. Cl.
*E02F 9/22* (2006.01)
*B62D 1/12* (2006.01)
(Continued)

(52) U.S. Cl.
CPC ............... *E02F 9/225* (2013.01); *B62D 1/12* (2013.01); *B62D 6/008* (2013.01); *B62D 12/00* (2013.01);
(Continued)

(58) Field of Classification Search
None
See application file for complete search history.

(56) References Cited

U.S. PATENT DOCUMENTS 5,489,005 A   2/1996 Marcott et al.
6,202,501 B1  3/2001 Ikari
(Continued)

FOREIGN PATENT DOCUMENTS

CN   202089106 U   12/2011
CN   102303490 A    1/2012
(Continued)

OTHER PUBLICATIONS

The International Search Report for the corresponding international application No. PCT/JP2019/027923, dated Oct. 1, 2019.
(Continued)

*Primary Examiner* — Abdhesh K Jha
(74) *Attorney, Agent, or Firm* — Global IP Counselors, LLP

(57) ABSTRACT

An articulated work vehicle has front and rear frames coupled. The work vehicle includes a hydraulic actuator driven by hydraulic pressure to change a vehicle body frame angle of the front frame with respect to the rear frame, a lever rotatable to change the body frame angle, a control valve that controls a flow rate of oil supplied to the hydraulic actuator, and a controller. The controller sets a target angle of the vehicle body frame angle with respect to an input angle of the lever, and controls the control valve such that an actual angle of the vehicle body frame angle matches the target angle of the vehicle body frame angle.

18 Claims, 21 Drawing Sheets

(51) Int. Cl.
  *B62D 6/00* (2006.01)
  *B62D 12/00* (2006.01)
  *E02F 9/08* (2006.01)
  *E02F 9/20* (2006.01)
  *F15B 13/042* (2006.01)
  *E02F 3/28* (2006.01)

(52) U.S. Cl.
  CPC .......... *E02F 9/0841* (2013.01); *E02F 9/2004* (2013.01); *E02F 9/2225* (2013.01); *F15B 13/0422* (2013.01); *E02F 3/283* (2013.01); *E02F 9/2285* (2013.01); *E02F 9/2292* (2013.01)

(56) References Cited

U.S. PATENT DOCUMENTS

| | | | |
|---|---|---|---|
| 7,412,315 | B2 | 8/2008 | Wildey et al. |
| 7,881,841 | B2 * | 2/2011 | Dattilo .................. B62D 6/008 701/42 |
| 8,448,741 | B2 | 5/2013 | Breiner et al. |
| 2005/0139412 | A1 | 6/2005 | Vigholm |
| 2008/0162000 | A1 | 7/2008 | Dattilo et al. |
| 2015/0239492 | A1 | 8/2015 | Yukitake |
| 2018/0105202 | A1* | 4/2018 | Ikari .................. B62D 5/0832 |
| 2018/0105203 | A1 | 4/2018 | Takenaka et al. |
| 2018/0105205 | A1 | 4/2018 | Takenaka et al. |
| 2019/0017245 | A1 | 1/2019 | Takenaka et al. |
| 2020/0290672 | A1 | 9/2020 | Teranishi |

FOREIGN PATENT DOCUMENTS

| | | | | |
|---|---|---|---|---|
| CN | 104875786 | A | | 9/2015 |
| CN | 206465849 | U | | 9/2017 |
| CN | 111465547 | A | | 7/2020 |
| DE | 20 2013 009 644 | U1 | | 2/2014 |
| EP | 1 539 560 | B1 | | 9/2007 |
| FR | 1499272 | A | | 10/1967 |
| JP | 10-45014 | A | | 2/1998 |
| JP | H1045014 | A | * 2/1998 | ............... B62D 5/09 |
| JP | 11-321664 | A | | 11/1999 |
| JP | 2007-320538 | A | | 12/2007 |
| JP | 2010-515150 | A | | 5/2010 |
| JP | 2010-264833 | A | | 11/2010 |
| JP | 4800118 | B2 | | 10/2011 |
| JP | 2017-213994 | A | | 12/2017 |
| WO | 2017/073617 | A1 | | 5/2017 |

OTHER PUBLICATIONS

The extended European search report for the corresponding European application No. 19849369.4, dated Dec. 10, 2021.

* cited by examiner

Xf ←——X——→ Xb

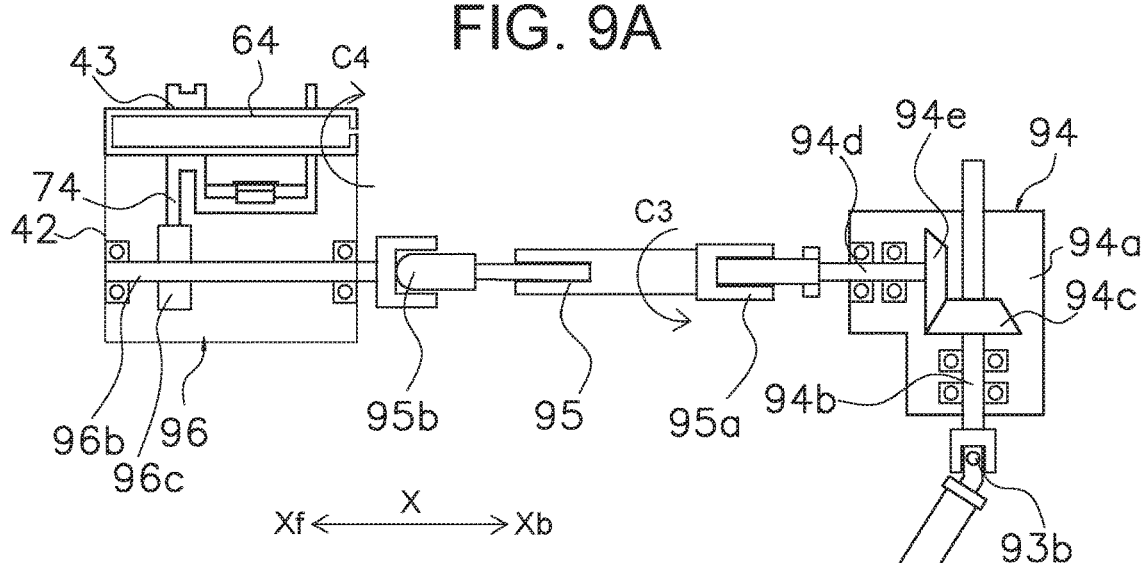
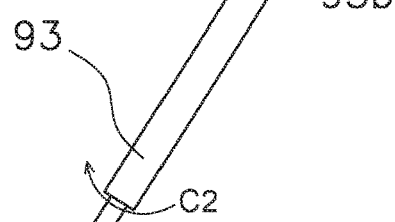
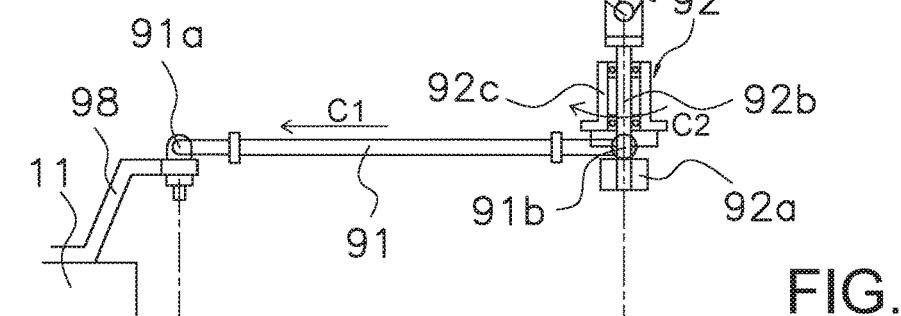
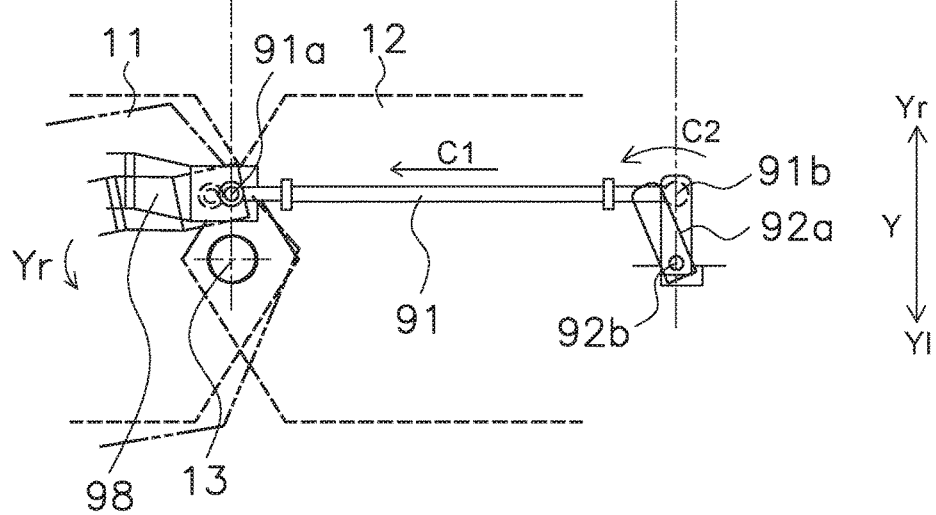

WORK VEHICLE

CROSS-REFERENCE TO RELATED APPLICATIONS

This application is a U.S. National stage application of International Application No. PCT/JP2019/027923, filed on Jul. 16, 2019. This U.S. National stage application claims priority under 35 U.S.C. § 119(a) to Japanese Patent Application No. 2018-152452, filed in Japan on Aug. 13, 2018, the entire contents of which are hereby incorporated herein by reference.

BACKGROUND

Field of the Invention

The present invention relates to a work vehicle.

Background Information

As an articulated work vehicle, there is disclosed a wheel loader in which a steering angle is changed by controlling a flow rate of oil supplied to a hydraulic actuator arranged across a front frame and a rear frame (for example, see Japanese Patent Laid-open No. H11-321664).

In the wheel loader disclosed in Japanese Patent Laid-open No. H11-321664, a position control type operation system that outputs a hydraulic cylinder drive command based on a difference between a target articulate angle that matches the lever input angle by operating a joystick lever and an actual articulate angle is used.

SUMMARY

However, in the case of the position control type operation system, the operator needs to operate the joystick lever by the same angle as the large actual articulate angle, the large lever operation angle causes an unreasonable posture, and the operator is easily tired when operating for a long time.

An object of the present invention is to provide a work vehicle capable of reducing operator fatigue.

A work vehicle to the invention is an articulated type work vehicle in which a front frame and a rear frame are coupled each other, and comprises a hydraulic actuator, a lever, a control valve, and a control unit. The hydraulic actuator is driven by hydraulic pressure to change a vehicle body frame angle of the front frame with respect to the rear frame. The lever is rotated to input a target value of the vehicle body frame angle. The control valve controls a flow rate of oil supplied to the hydraulic actuator. The controller sets the target angle of the vehicle body frame angle with respect to an input angle of the lever, and controls the control valve so that an actual angle of the vehicle body frame angle matches the target angle of the vehicle body frame angle. An absolute value of a target value of the vehicle body frame angle corresponding to an absolute value of an input angle of the lever is at least partially larger than the absolute value of the input angle of the lever.

According to the present invention, it is possible to provide a work vehicle capable of reducing operator fatigue.

BRIEF DESCRIPTION OF THE DRAWINGS

FIG. 9A is a configuration view illustrating a link mechanism in FIG. 3, and FIG. 9B a rear view showing the vicinity of the coupling shaft part in the link mechanism of FIG. 3.

DETAILED DESCRIPTION OF EMBODIMENT(S)

The following is an explanation of a wheel loader as an example of a work vehicle according to the present invention with reference to the drawings.

Embodiment 1

A wheel loader 1 according to a first embodiment according to the present invention is explained hereinbelow.

Outline of Configuration of Wheel Loader 1

Figure 1:
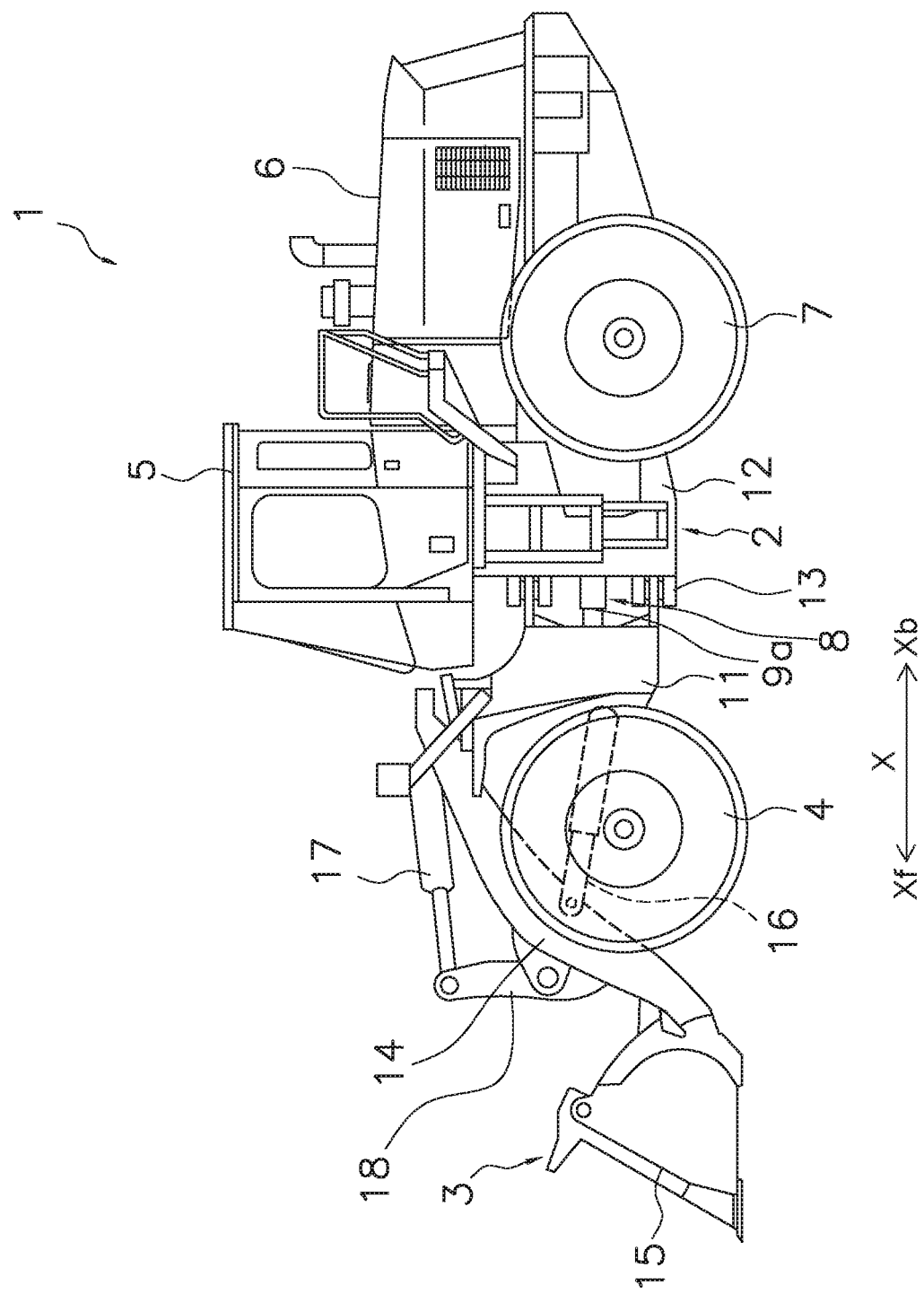
FIG. 1 is a side view illustrating a wheel loader of a first embodiment according to the present invention.

FIG. 1 is a schematic view of a configuration of the wheel loader 1 of the present embodiment. The wheel loader 1 of the present embodiment is provided with a vehicle body frame 2, a work implement 3, a pair of front tires 4, a cab 5, an engine room 6, a pair of rear tires 7, a steering system 8 (refer to FIG. 2 described later), and steering cylinders 9*a* and 9*b*. In the following explanations, "front," "rear,"

"right," "left," "up," and "down" indicate directions relative to a state of looking forward from the operator's seat. "Vehicle width direction" and "left-right direction" have the same meaning. In FIG. 1, "X" indicates the front-rear direction and "Xf" is used to indicate the forward direction and "Xb" is used to indicate the rearward direction. In addition, the left-right direction is indicated with "Y," and "Yr is used to indicate the right direction and "Yl" is used to indicate the left direction in the following drawings. The wheel loader 1 is an example of a work vehicle. The steering cylinders 9a and 9b are examples of hydraulic actuators.

The wheel loader 1 is able to carry out work such as earth and sand loading by using the work implement 3. The vehicle body frame 2 is a so-called articulated type and includes a front frame 11, a rear frame 12, and a coupling shaft part 13. The front frame 11 is arranged in front of the rear frame 12. The coupling shaft part 13 is provided in the center in the vehicle width direction, and couples the front frame 11 and the rear frame 12 to each other in a manner that allows swinging. The pair of front tires 4 are attached to the left and right of the front frame 11. The pair of rear tires 7 are attached to the left and right of the rear frame 12. The front frame 11 is an example of a front frame, and the rear frame 12 is an example of a rear frame.

The work implement 3 is driven by hydraulic fluid from a work implement pump which is not illustrated. The work implement 3 includes a boom 14, a bucket 15, a lift cylinder 16, and a bucket cylinder 17. The boom 14 is mounted onto the front frame 11. The bucket 15 is attached to the tip of the boom 14.

The lift cylinder 16 and the bucket cylinder 17 are hydraulic cylinders. One end of the lift cylinder 16 is attached to the front frame 11 and the other end of the lift cylinder 16 is attached to the boom 14. The boom 14 swings up and down due to the extension and contraction of the lift cylinder 16. One end of the bucket cylinder 17 is attached to the front frame 11 and the other end of the bucket cylinder 17 is attached to the bucket 15 via a bell crank 18. The bucket 15 swings up and down due to the extension and contraction of the bucket cylinder 17.

The cab 5 is disposed on the rear frame 12. A joystick lever 41 (see FIG. 2 below) for performing steering operations, an lever for operating the work implement 3, and various display devices are arranged inside the cab 5. The engine room 6 is arranged to the rear of the cab 5 and on the rear frame 12 and contains an engine.

Figure 2A:
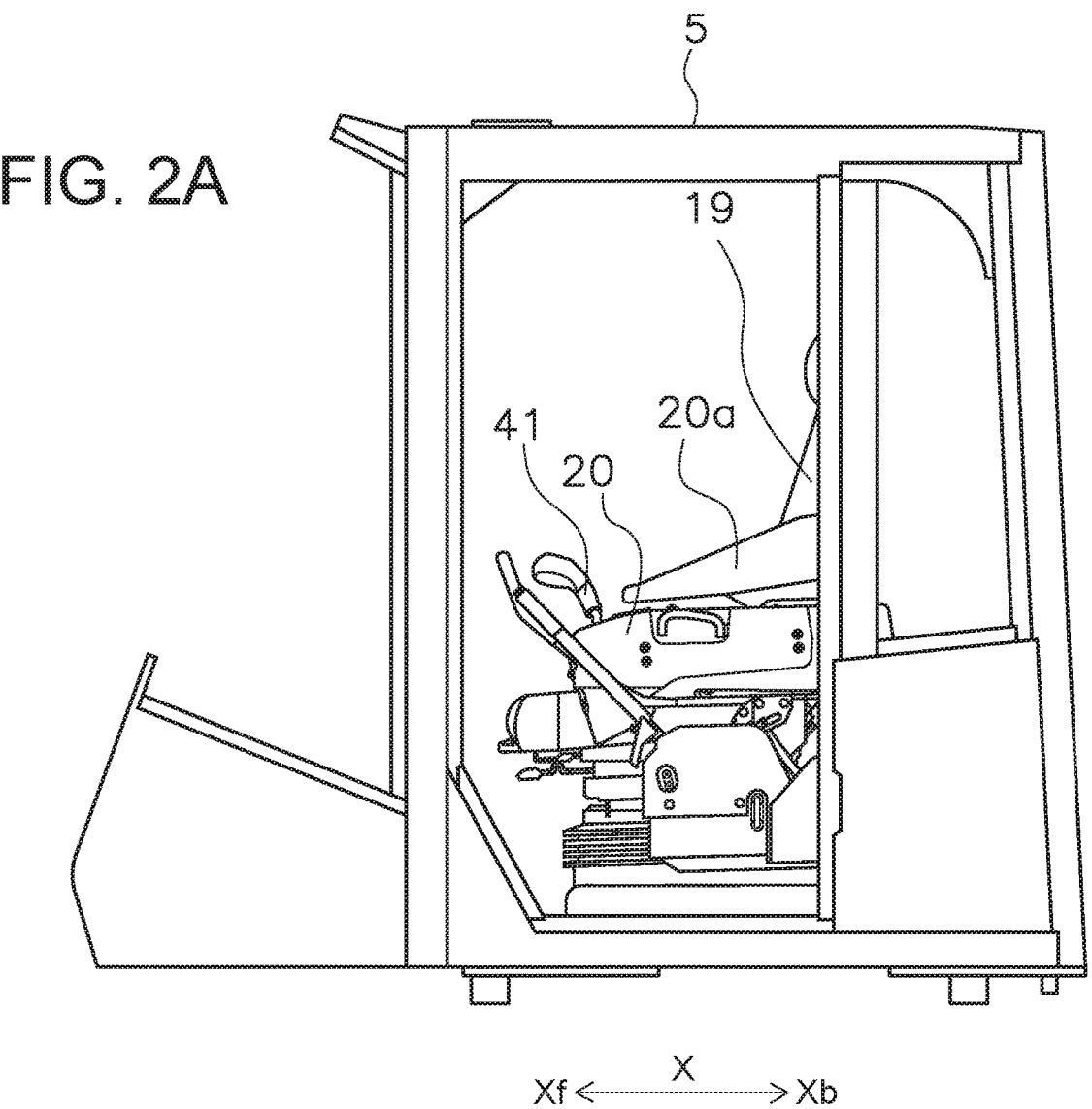
FIG. 2A is a side view illustrating the vicinity of the cab in FIG. 1.

FIG. 2A is a partial side view of the cab 5. An operator's seat 19 is provided in the cab 5 and a console box 20 is arranged to the side of the operator's seat. An arm rest 20a is arranged on the upper side of the console box 20. The joystick lever 41 is arranged upward from the front end of the console box 20.

Figure 2B:
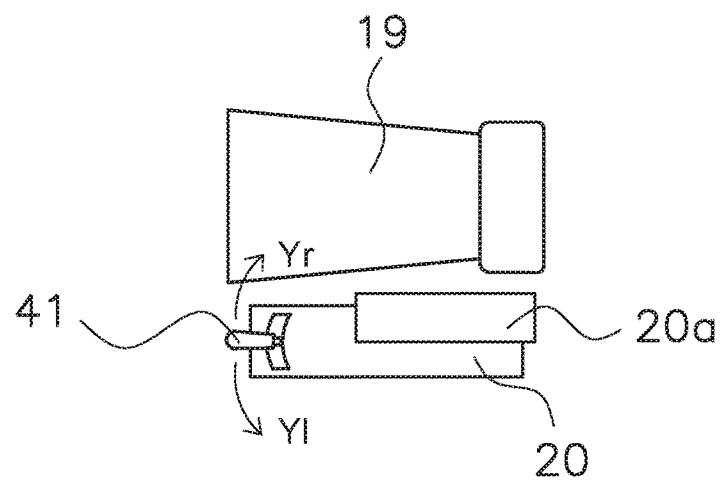
FIG. 2B is a schematic plan view of the vicinity of the operator's seat.

FIG. 2B is a schematic plan view near the operator's seat 19. As illustrated in FIG. 2B, as an example, the console box 20 is arranged on the left side of the operator's seat 19. Therefore, the joystick lever 41 is operated by the left hand. Further, the joystick lever 41 is rotatable in a right direction Yr which is an inner side of the operator's seat 19 and a left direction Yl which is an outer side of the operator's seat 19.

Figure 3:
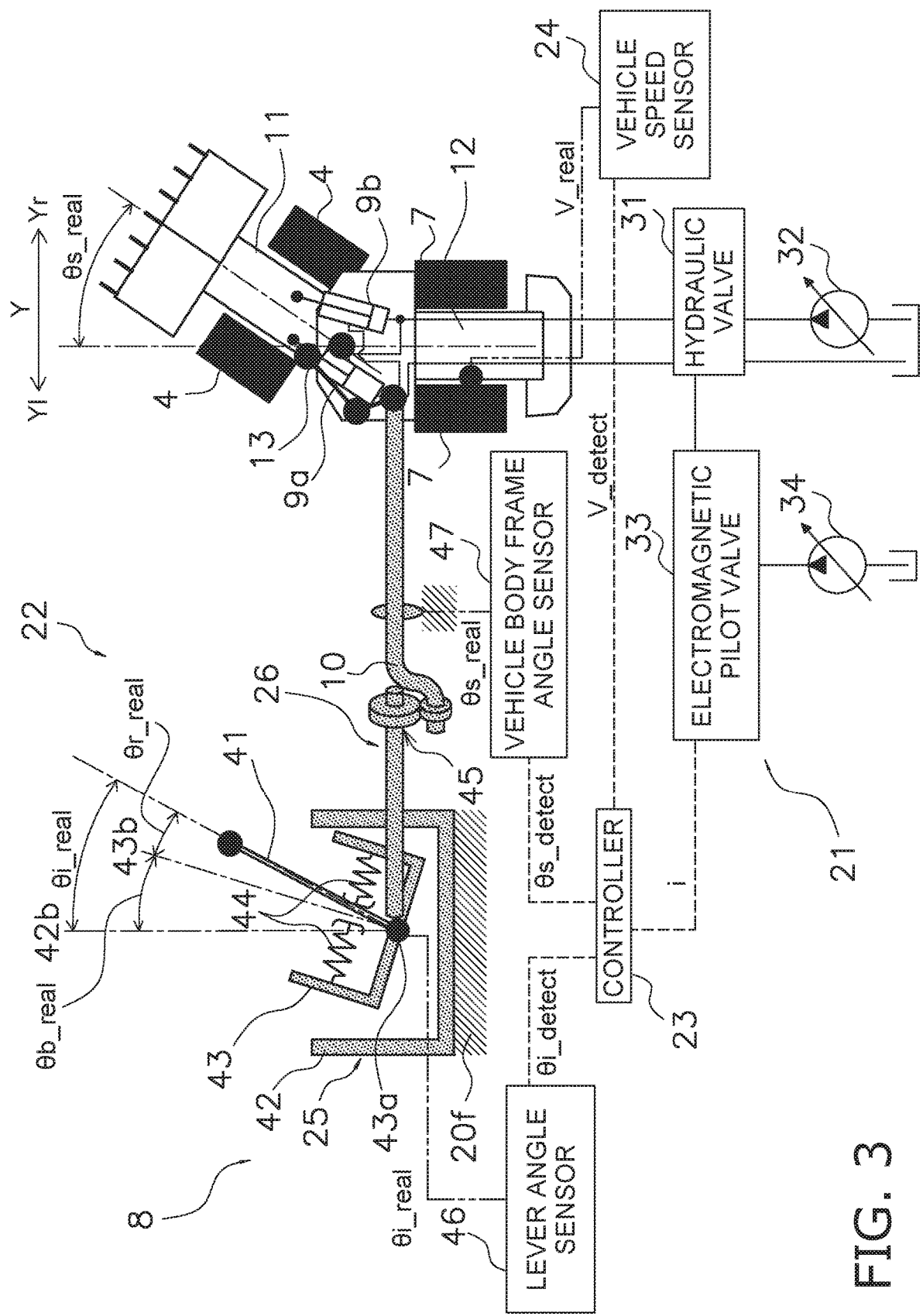
FIG. 3 is a configuration view illustrating a steering system in FIG. 1.

FIG. 3 is a configuration view illustrating the steering system 8. The steering system 8 changes the flow rate of oil supplied to the steering cylinders 9a and 9b, thereby changing the vehicle body frame angle of the front frame 11 with respect to the rear frame 12 and changing the traveling direction of the wheel loader 1. The steering cylinders 9a and 9b correspond to an example of a hydraulic actuator.

The pair of steering cylinders 9a and 9b are driven by hydraulic pressure. The pair of steering cylinders 9a and 9b are arranged side by side on the left and right sides in the vehicle width direction with the coupling shaft part 13 interposed therein. The steering cylinder 9a is arranged on the left side of the coupling shaft part 13. The steering cylinder 9b is arranged on the right side of the coupling shaft part 13. One end of each of the steering cylinders 9a and 9b is attached to the front frame 11 and the other end each is attached to the rear frame 12.

When the steering cylinder 9a extends and the steering cylinder 9b contracts due to hydraulic pressure from the belowmentioned steering system 8, a vehicle body frame actual angle $\theta s\_real$ is changed and the vehicle turns to the right. When the steering cylinder 9a contracts and the steering cylinder 9b extends due to hydraulic pressure from the steering system 8, the vehicle body frame actual angle $\theta s\_real$ is changed and the vehicle turns to the left. In the present embodiment, the vehicle body frame actual angle $\theta s\_real$ when the front frame 11 and the rear frame 12 are arranged in the front-rear direction is set to zero, the right side is a positive value, and the left side is a negative value. The vehicle body frame actual angle $\theta s\_real$ corresponds to an actual angle of the vehicle body frame angle.

(Steering System 8)

The steering system 8 has an adjusting mechanism 21, a steering device 22, a controller 23, and a vehicle speed sensor 24. The controller 23 corresponds to an example of a controller. The adjusting mechanism 21 adjusts the drive output of the steering cylinders 9a and 9b. The steering device 22 has a joystick lever 41 and the like, and an operator inputs a target value of a steering angle of the wheel loader 1. The controller 23 instructs the adjusting mechanism 21 to adjust the drive output of the steering cylinders 9a and 9b based on the target value of the steering angle input to the steering device 22. The vehicle speed sensor 24 detects the vehicle speed V of the wheel loader 1, and transmits the vehicle speed V as a detection signal to the controller 23.

In FIG. 3, transmission of signals based on electricity is represented by the dotted lines, and transmission based on hydraulic pressure is represented by solid lines. Further, detection by sensors is represented by a two-dot chain line.

(Adjusting Mechanism 21)

The adjusting mechanism 21 adjusts the flow rate of oil supplied to the steering cylinders 9a and 9b. The adjusting mechanism 21 has a hydraulic valve 31, a main pump 32, an electromagnetic pilot valve 33, and a pilot pump 34. The hydraulic valve corresponds to an example of a control valve.

The hydraulic valve 31 is a flow rate adjusting valve that adjusts the flow rate of oil supplied to the steering cylinders 9a and 9b according to the input pilot pressure. For the hydraulic valve 31, for example, a spool valve is used. The main pump 32 supplies the hydraulic fluid that operates the steering cylinders 9a and 9b to the hydraulic valve 31.

The hydraulic valve 31 has an obturating element (not illustrated) that can be moved to the left steering position, the neutral position, and the right steering position. When the obturating element of the hydraulic valve 31 is arranged at the left steering position, the steering cylinder 9a contracts and the steering cylinder 9b extends, the vehicle body frame actual angle $\theta s\_real$ decrease, and the vehicle body turns to the left.

When the obturating element of the hydraulic valve 31 is arranged at the right steering position, the steering cylinder 9b contracts and the steering cylinder 9a extends, the vehicle body frame actual angle θs_real increases, and the vehicle body turns to the right. When the obturating element of the hydraulic valve 31 is arranged at the neutral position, the vehicle body frame actual angle θs_real does not change.

The electromagnetic pilot valve 33 is a flow rate adjusting valve that adjusts the flow rate of pilot hydraulic pressure supplied to the hydraulic valve 31 in accordance with a command from the controller 23. The pilot pump 34 supplies hydraulic fluid that operates the hydraulic valve 31 to the electromagnetic pilot valve 33. The electromagnetic pilot valve 33 is, for example, a spool valve or the like, and is controlled according to a command from the controller 23.

The electromagnetic pilot valve 33 has an obturating element (not illustrated) movable to the left pilot position, the neutral position, and the right pilot position. When the obturating element of the electromagnetic pilot valve 33 is arranged at the left pilot position, the hydraulic valve 31 is in the left steering position. When the obturating element of the electromagnetic pilot valve 33 is arranged at the right pilot position, the hydraulic valve 31 is in the right steering position. When the obturating element of the electromagnetic pilot valve 33 is arranged in the neutral position, the hydraulic valve 31 is in the neutral position.

As described above, by controlling the pilot pressure from the electromagnetic pilot valve 33 in accordance with the command from the controller 23, the hydraulic valve 31 is controlled and the steering cylinders 9a, 9b are controlled.

(Steering Device 22)

The steering device 22 has an operation unit 25, a lever angle sensor 46, and a vehicle body frame angle sensor 47.

(Operation Unit 25)

Figure 4A:
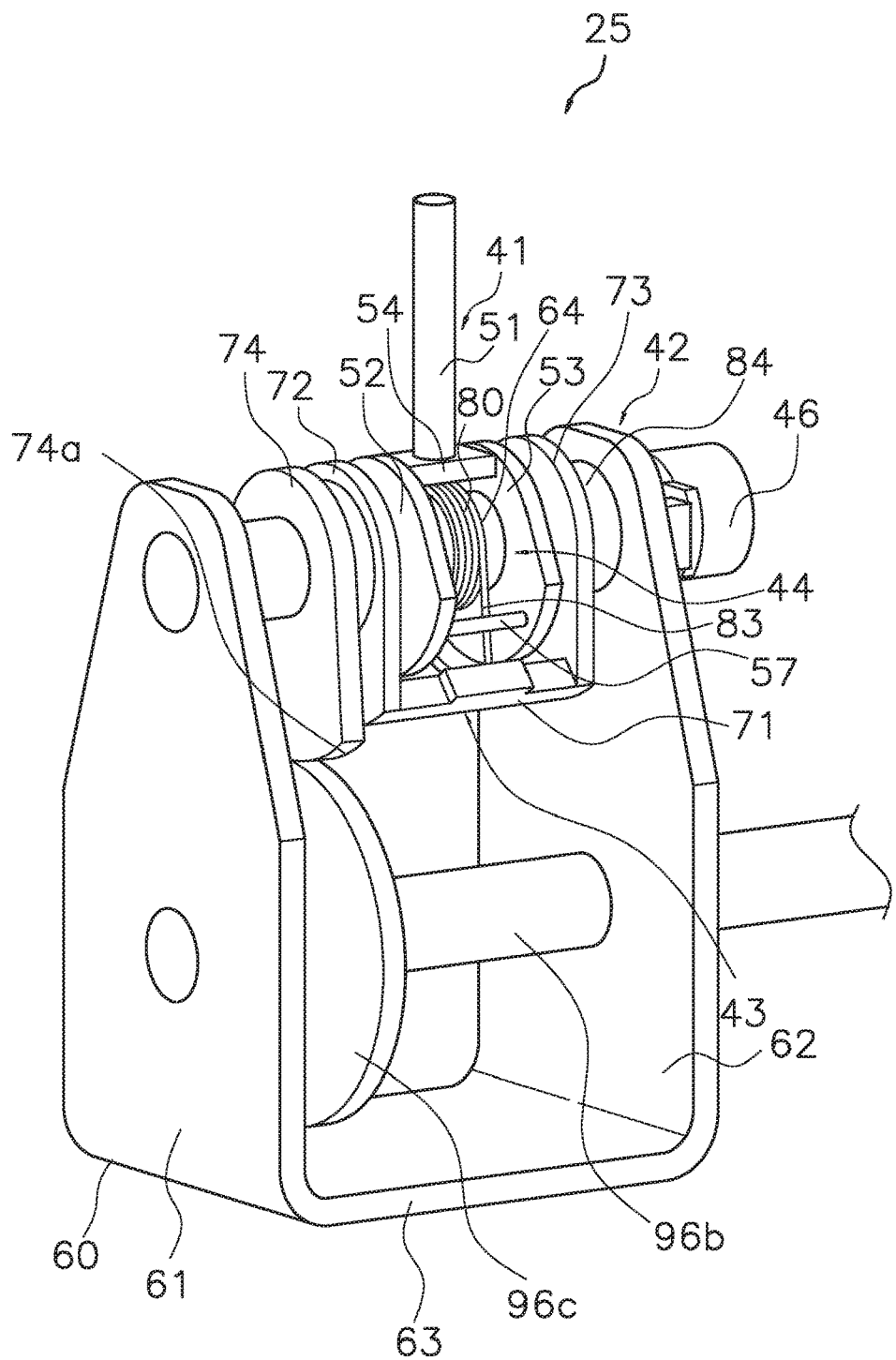
FIG. 4A is a perspective view illustrating an operating unit of FIG. 3.
Figure 4B:
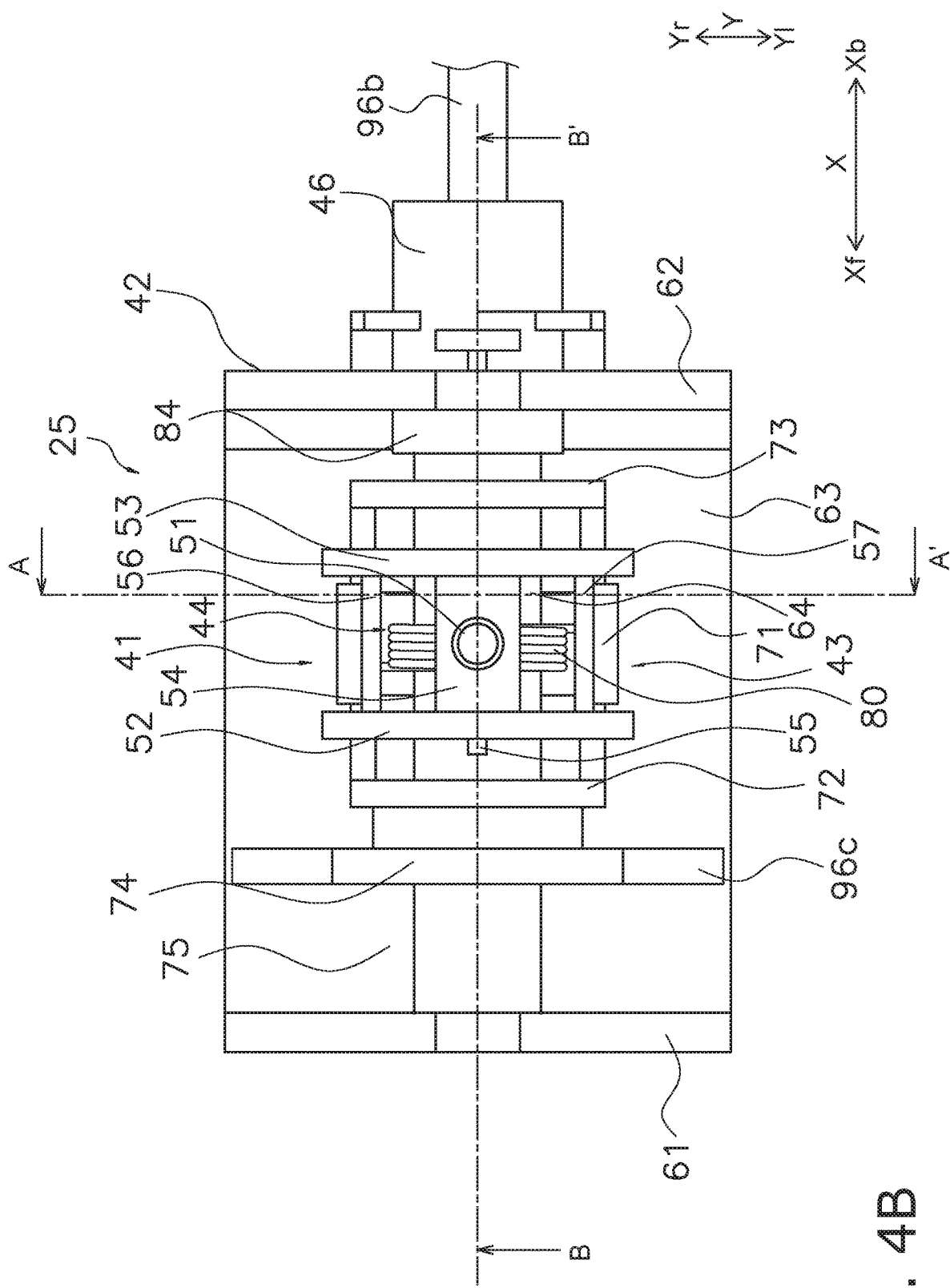
FIG. 4B is a plan view illustrating the operation unit of FIG. 4A.
Figure 4C:
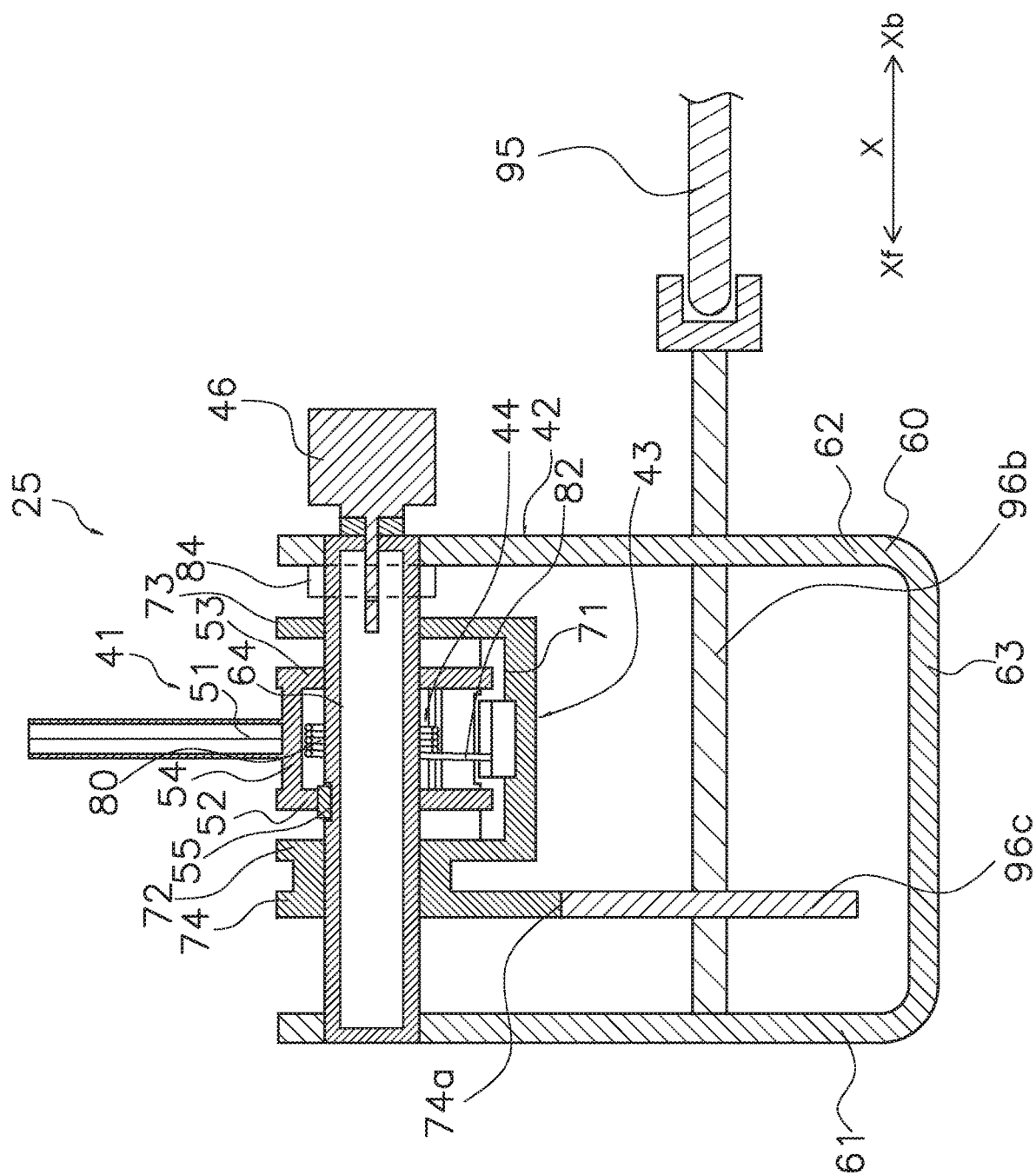
FIG. 4C is a reference arrow cross-sectional view along line B to B' in FIG. 4B.
Figure 4D:
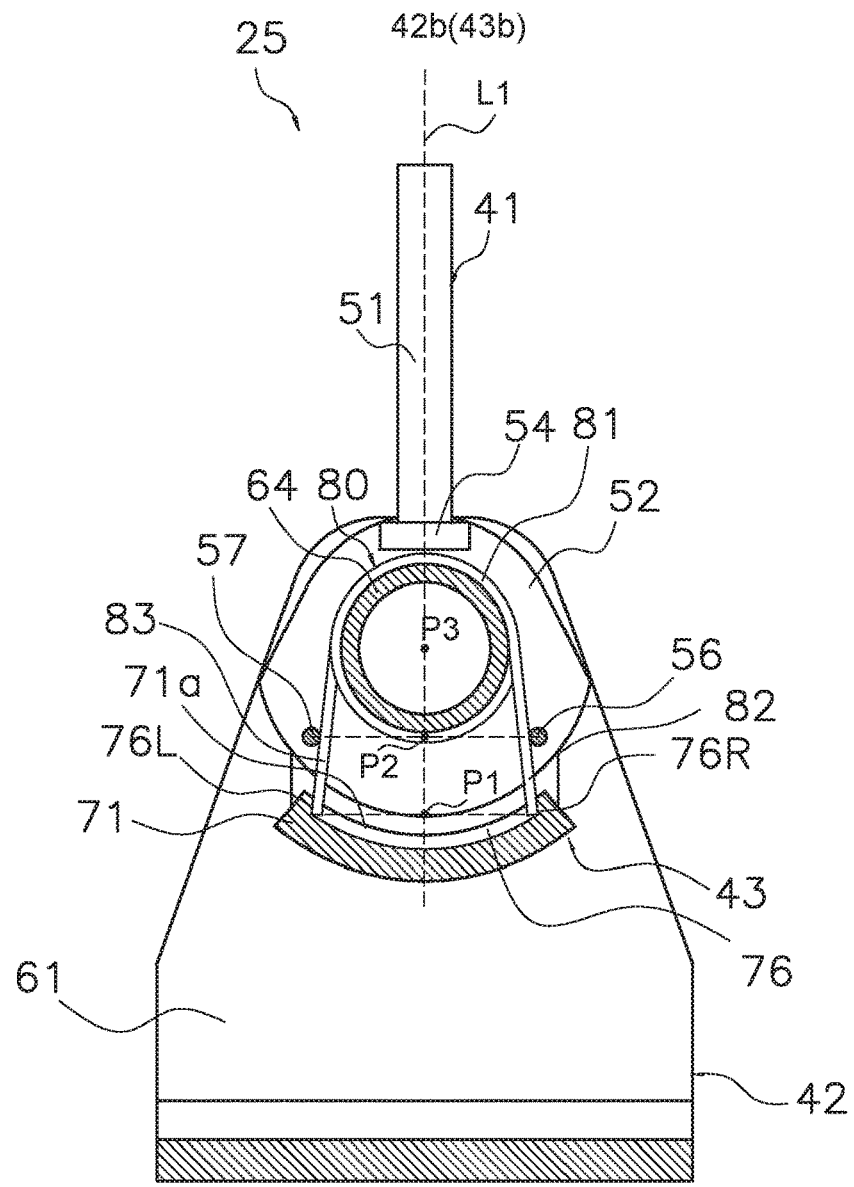
FIG. 4D is a reference arrow cross-sectional view along line A to A' in FIG. 4B.

FIG. 4A is a perspective view of the operation unit 25. FIG. 4B is a plan view of the operation unit 25. FIG. 4C is a side sectional view of the operation unit 25, and is a reference arrow cross-sectional view along line B to B' of FIG. 4B. FIG. 4D is a reference arrow cross-sectional view along line A to A' of FIG. 4B. Further, the configuration of the transmission mechanism 10 and the like is omitted in FIG. 4D.

As illustrated in FIG. 4A, the operation unit 25 has a joystick lever 41, a support part 42, a base member 43, and a biasing part 44. The joystick lever 41 corresponds to an example of a lever.

The joystick lever 41 is operated by the operator. The support part 42 is fixed to the console box 20 and rotatably supports the joystick lever 41. The base member 43 is rotatably supported by the support part 42. The biasing part 44 biases the joystick lever 41 to a predetermined position with respect to the base member 43.

(Joystick Lever 41)

The joystick lever 41 is arranged at a front end part of the console box 20, as illustrated in FIG. 2.

As illustrated in FIG. 4C, the joystick lever 41 has a lever portion 51, a pair of connecting plates 52 and 53, a connecting portion 54, and a key 55.

The lever portion 51 is a rod-shaped member and is operated by an operator. The pair of connecting plates 52 and 53 connects the lever portion 51 and a rotating shaft 64 (described later) of the support part 42, and transmits the rotation of the lever portion 51 to the rotating shaft 64.

Each of the pair of connecting plates 52 and 53 is arranged such that the plate-shaped main surface is substantially perpendicular to the front-rear direction X. The pair of connecting plates 52 and 53 are arranged facing each other along the front-rear direction X with a predetermined space therebetween.

The connecting portion 54 is arranged between the pair of connecting plates 52 and 53 so as to connect upper end portions of the pair of connecting plates 52 and 53. A lower end of the lever portion 51 is fixed to a upper surface of the connecting portion 54. A through hole is formed in each of the pair of connecting plates 52 and 53, and the rotating shaft 64 is inserted into the through holes of the connecting plates 52 and 53. As illustrated in FIG. 4C, the key 55 fits into a recess formed in an edge of the through hole of the connecting plate 52 and a groove formed on the rotating shaft 64, and transmits the rotation of the connecting plate 52 to the rotating shaft 64. The rotating shaft 64 is rotatably supported by the support part 42.

Further, as illustrated in FIGS. 4A and 4B, rod-shaped connecting members 56 and 57 that connect the connecting plates 52 and 53 are provided. As illustrated in FIG. 4D, the connecting member 56 and the connecting member 57 are arranged below a center P3 of the rotating shaft 64 and outside the rotating shaft 64 in the vehicle width direction. The connecting member 56 is arranged on the right direction Yr side of the rotating shaft 64 in the vehicle width direction Y, and the connecting member 57 is arranged on the left direction Yl side of the rotating shaft 64 in the vehicle width direction Y.

When the lever portion 51 is rotated by the operator, the pair of connecting plates 52 and 53 are also rotated together with the connecting portion 54, and the rotating shaft 64 is rotated via the key 55.

(Support Part 42)

The support part 42 rotatably supports the joystick lever 41. The support part 42 is fixed to, for example, the inside of the console box 20 illustrated in FIG. 2. As illustrated in FIG. 4A, the support part 42 has a support frame 60 and a rotating shaft 64.

The support frame 60 is a member formed in a U shape in a side view, as illustrated in FIGS. 4A and 4C. The support frame 60 has a pair of shaft support portions 61 and 62 facing each other in the front-rear direction X, and a connecting portion 63 that connects the lower end of the shaft support portion 61 and the lower end of the shaft support portions 62. A through hole is formed in each of the shaft support portion 61 and the shaft support portion 62 along the front-rear direction X.

The rotating shaft 64 is rotatably inserted into through holes formed in the shaft support portions 61 and 62. The rotating shaft 64 is arranged in a substantially horizontal direction and along the front-rear direction X.

(Base Member 43)

The base member 43 is rotatably supported by the support part 42. As illustrated in FIG. 4A, the base member 43 has a base plate 71, a pair of support plates 72 and 73, and a transmission gear portion 74.

The base plate 71 is a plate-shaped member arranged so as to cover the pair of connecting plates 52 and 53 from below. The base plate 71 is convexly curved downward when viewed in the front-rear direction X (see FIG. 4D).

The pair of support plates 72 and 73 rotatably support the base plate 71 on the rotating shaft 64, as illustrated in FIGS. 4A and 4C. The pair of support plates 72 and 73 are arranged so as to sandwich the connecting plates 52 and 53 from the outside in the front-rear direction X. As illustrated in FIGS. 4B and 4C, the support plate 72 is arranged on the front direction Xf side of the connecting plate 52, and the support plate 73 is arranged on the rear direction Xb side of the connecting plate 53.

Through holes are formed in the support plates 72 and 73 along the front-rear direction X, and the rotating shaft 64 is inserted into these through holes. In this way, the support plates 72 and 73 are rotatably arranged with respect to the rotating shaft 64.

As illustrated in FIGS. 4A and 4D, the lower ends of the support plates 72 and 73 are convexly curved downward, and the base plate 71 is arranged so as to connect the lower end of the support plate 72 and the lower end of the support plate 73. As illustrated in FIG. 4D, a groove 76 is formed in the vehicle width direction Y on a upper surface 71a of the base plate 71. An end of the groove 76 on the right direction Yr side in the vehicle width direction Y is indicated by 76R, and an end on the left direction Yl side is indicated by 76L.

The transmission gear portion 74 transmits the information about the vehicle body frame angle θs_real to the base member 43 via the transmission mechanism 10. As illustrated in FIG. 4C, the transmission gear portion 74 is arranged on the front side of the support plate 72 and is connected to the support plate 72. A through hole is formed in the transmission gear portion 74 along the front-rear direction X, and the rotating shaft 64 is inserted into the through hole. As a result, the transmission gear portion 74 is configured to be rotatable with respect to the rotating shaft 64. As illustrated in FIG. 4A, the transmission gear portion 74 has a lower end surface 74a that is convexly curved downward, and a gear shape is formed on the lower end surface 74a. The lower end surface 74a meshes with a transmission gear 96c of the transmission mechanism 10, which will be described later, as illustrated in FIG. 4C.

The base member 43 is rotatable with respect to the rotating shaft 64 by the transmission mechanism 10 described later (see FIG. 3 and FIG. 11B described later). When the transmission gear portion 74 rotates with respect to the support part 42 via the transmission mechanism 10, the support plates 72 and 73 and the base plate 71 connected to the transmission gear portion 74 also rotate.

(Biasing Part 44)

The biasing part 44 biases the joystick lever 41 to the base reference position 43b with respect to the base plate 71. Specifically, as illustrated in FIG. 4D, the biasing part 44 biases the joystick lever 41 so that the lever portion 51 is arranged at the center of the base plate 71 in the vehicle width direction Y.

Specifically, the base reference position 43b is a position on a line connecting a center position P1 of between a right end 76R and a left end 76L of the groove 76 of the base plate 71 and a center position P3 of the rotating shaft 64. In the state illustrated in FIG. 4D, the straight line L1 along the longitudinal direction of the lever portion 51 is arranged at the base reference position 43b, and the lever portion 51 is not rotated with respect to the base member 43.

The biasing part 44 has a spring member 80 and a damper 84. The spring member 80 is a coil spring, and is arranged around the rotating shaft 64 as illustrated in FIG. 4A.

Accordingly, a counterforce can be generated when the operator operates the lever portion 51 from a predetermined position to the left or right with respect to the base plate 71, and a feeling of operation can be given to the operator.

The rotating shaft 64 is inserted into the spring member 80. The spring member 80 is arranged between the pair of connecting plates 52 and 53.

As illustrated in FIG. 4D, the spring member 80 has a coil portion 81, a first end portion 82, and a second end portion 83. The rotating shaft 64 inserts through the coil portion 81. The first end portion 82 and the second end portion 83 extend downward from the coil portion 81 and are arranged between the connecting member 56 and the connecting member 57.

When the lever portion 51 is arranged at the above base reference position 43b, the first end portion 82 is arranged on the left direction Yl side of the connecting member 56 in a state of being in contact with the connecting member 56. A lower end of the first end portion 82 is in contact with the right end 76R of the groove 76. The second end portion 83 is arranged on the right direction Yr side of the connecting member 57 in a state of being in contact with the connecting member 57. A lower end of the second end portion 83 is in contact with the left end 76L of the groove 76.

The spring member 80 exerts an elastic force so as to push the connecting member 56 and the right end 76R toward the right direction Yr side and push the connecting member 57 and the left end 76L toward the left direction Yl side.

The counterforce generated on the joystick lever 41 by the spring member 80 will be described. A counterforce is generated by the spring member 80 according to the rotation angle of the joystick lever 41 with respect to the base member 43.

Here, as illustrated in FIG. 3, the rotation angle of the lever portion 51 of the joystick lever 41 with respect to the support part 42 from the support reference position 42b is set as an actual lever input angle θi_real. The support reference position 42b is, as illustrated in FIG. 4D, a position on a straight line that passes through the center P3 of the rotating shaft 64 and is arranged in the vertical direction. The angle when the lever portion 51 is rotated in the right direction from the support reference position 42b is a positive value, and the angle when the lever portion 51 is rotated in the left direction from the support reference position 42b is a negative value.

Further, as illustrated in FIG. 3, the rotation angle of the base reference position 43b from the support reference position 42b of the support part 42 is the actual base angle θb_real of the base member 43 with respect to the support part 42. The angle when the base member 43 is rotated in the right direction from the support reference position 42b is a positive value, and the angle when the base member 43 is rotated in the left direction from the support reference position 42b is a negative value.

Figure 11A:
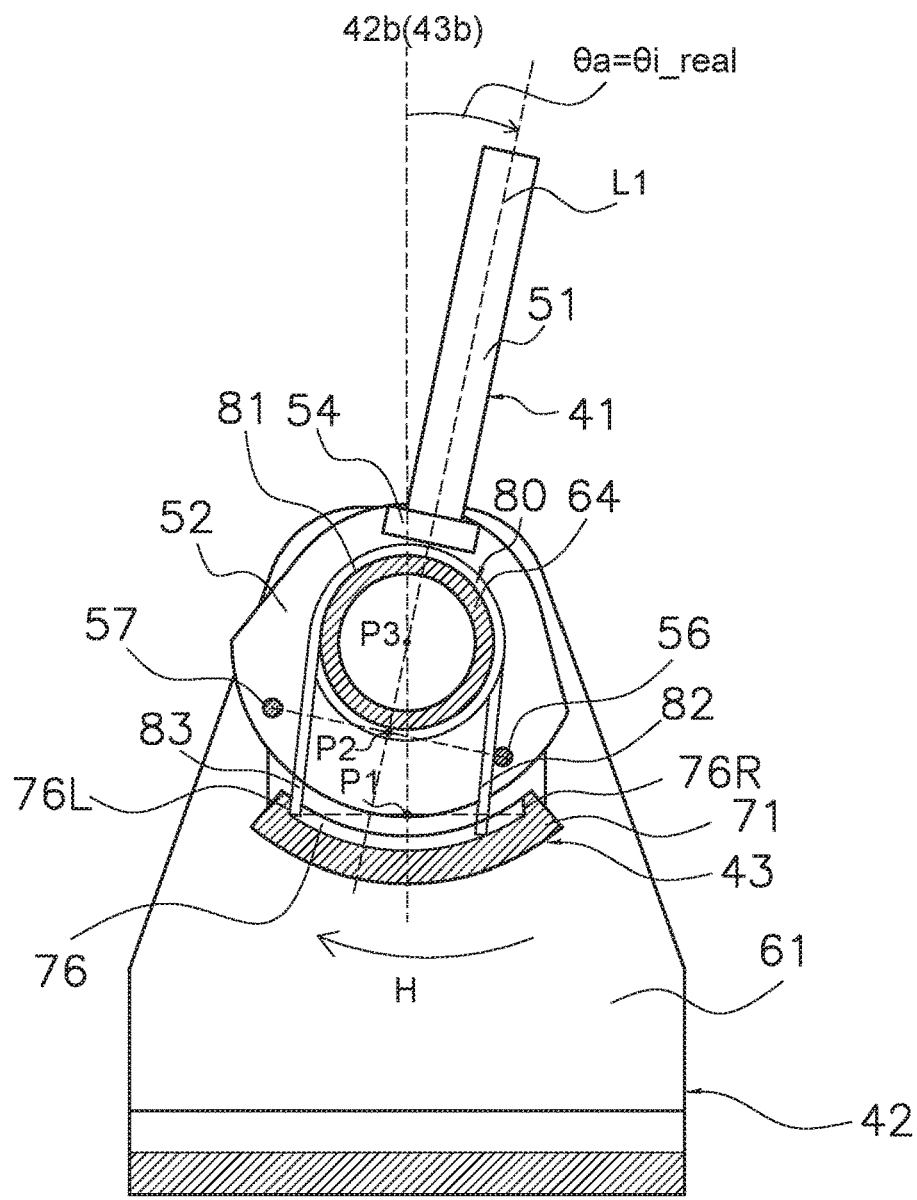
FIG. 11A is a view for explaining the control operation of the wheel loader of FIG. 1.
Figure 11B:
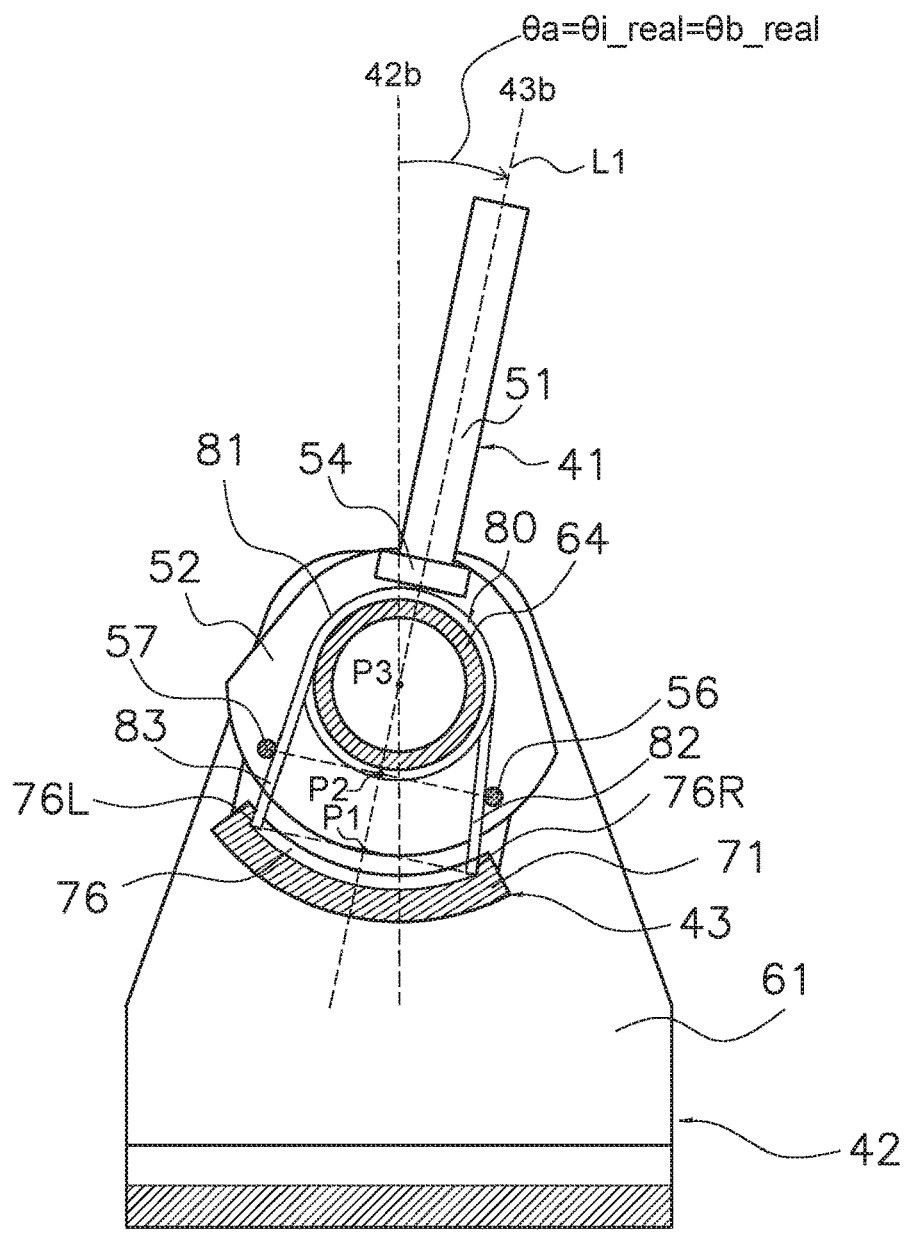
FIG. 11B is a view for explaining the control operation of the wheel loader of FIG. 1.

For example, as illustrated in FIG. 11A described later, when the lever portion 51 is rotated in the right direction, the first end portion 82 of the spring member 80 is pushed by the connecting member 56 in the clockwise direction (left direction Yl side) to move, and the tip end of the first end portion 82 is separated from the right end 76R of the groove 76 in the left direction Yl side. Further, since the tip end of the second end portion 83 is in contact with the left end 76L of the groove 76, the second end portion 83 cannot move in the clockwise direction (left direction Yl side), and the connecting member 57 is separated from the second end portion 83 in the left direction Yl side. As a result, the first end portion 82 of the spring member 80 biases the connecting member 56 so as to push the connecting member 56 in the counterclockwise direction, so the spring member 80 biases the joystick lever 41 so that the lever portion 51 returns to the base reference position 43b provided on the vertical line passing through the center P3 in the rotating shaft 64.

Figure 5:
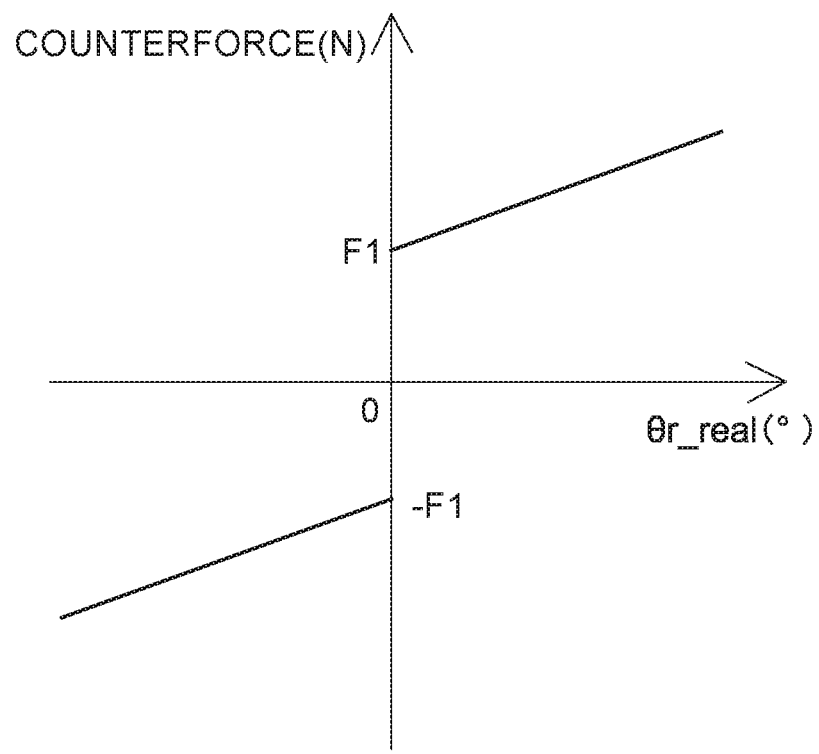
FIG. 5 is a view illustrating a counterforce of a spring member with respect to the difference between a lever angle and a base plate angle.

FIG. 5 is a view illustrating the relationship between the actual lever relative angle θr_real, which is the difference subtracting the actual base angle θb_real from the actual lever input angle θi_real and the counterforce generated by the spring member 80. The spring member 80 has a counterforce characteristic as illustrated in FIG. 5. In FIG. 5, θr_real of the positive value represents the case where the joystick lever 41 is rotated in the right direction with respect to the base member 43, and θr_real of the negative value represents the case where the joystick lever 41 is rotated in the left direction with respect to the base member 43. Further, a counterforce of the positive value represents a counterforce generated toward the left direction, and a counterforce of the negative value represents a counterforce generated toward the right direction.

When θr_real has a positive value, θr_real and the counterforce have a proportional relationship, the initial counterforce is F1, and the value of the counterforce increases as the value of θr_real increases. When θr_real has a negative value, the initial counterforce is −F1, and the value of the counterforce decreases as the value of θd_real decreases. That is, the spring characteristic of the spring member 80 is formed linearly, and as the absolute value of θr_real increases, the counterforce with respect to the rotating operation of the joystick lever 41 also increases.

Thus, by applying a force equal to or larger than the initial counterforce F1 to the joystick lever 41, the joystick lever 41 rotates with respect to the base member 43, and the counterforce also increases as the absolute value of θr_real increases.

The damper 84 is provided between the rotating shaft 64 and the shaft support portion 62. The damper 84 causes resistance according to the angular velocity of the lever portion 51.

(Lever Angle Sensor 46)

The lever angle sensor 46 is composed of, for example, a potentiometer, and detects the actual lever input angle θi_real, which is the rotation angle of the rotating shaft 64 with respect to the support part 42 (specifically, also referred to as the support frame 60), as a detection value θi_detect of the lever input angle. As illustrated in FIG. 4C, the lever angle sensor 46 is arranged outside the shaft support portion 62 of the support part 42 (on the rear direction Xb side).

The detection value θi_detect of the lever input angle detected by the lever angle sensor 46 is sent to the controller 23 as a detection signal.

(Vehicle Body Frame Angle Sensor 47)

The vehicle body frame angle sensor 47 detects the vehicle body frame actual angle θs_real as a detection value θs_detect of the vehicle body frame angle. The vehicle body frame angle sensor 47 is arranged in the vicinity of the coupling shaft part 13 arranged between the steering cylinders 9a and 9b or in the transmission mechanism 10 described later. The vehicle body frame angle sensor 47 is composed of, for example, a potentiometer, and the detection value θs_detect of the detected vehicle body frame angle is sent to the controller 23 as a detection signal.

Furthermore, each of the steering cylinders 9a and 9b may be provided with a cylinder stroke sensor that detects a stroke of the cylinder, and the detection values of these cylinder stroke sensors may be sent to the controller 23 to detect the detection value θs_detect of the vehicle body frame angle.

(Controller 23)

The controller 23 has a CPU, a memory, and the like, and executes each function described below. As illustrated in FIG. 3, the detection value θi_detect by the lever angle sensor 46, the detection value θs_detect by the vehicle body frame angle sensor 47, and the vehicle speed Vdetct detected by the vehicle speed sensor 24 are input to the controller 23. The controller 23 controls the electromagnetic pilot valve 33 based on these values.

Figure 6:
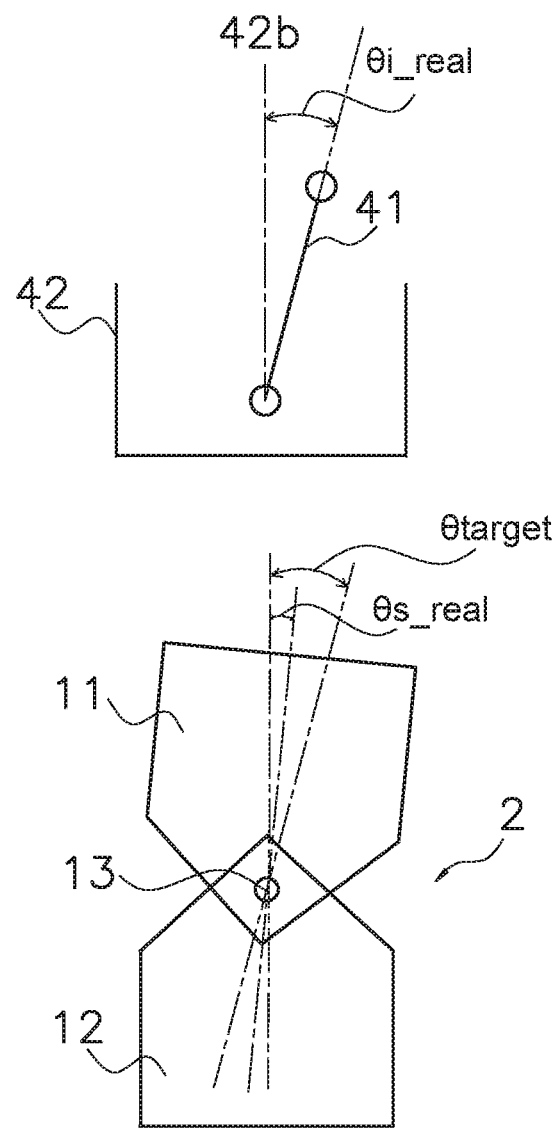
FIG. 6 is a view illustrating a relationship between an angle scale of a lever angle and an angle scale of a steering angle.

Here, FIG. 6 illustrates the relationship between the lever input angle θi_real, the vehicle body frame actual angle θs_real, and the vehicle body frame target angle θtarget. As illustrated in FIG. 6, the vehicle body frame target angle is calculated from the lever input angle θi_real, and the control is performed so that the vehicle body frame actual angle θs_real matches the vehicle body frame target angle θtarget. The vehicle body frame target angle θtarget corresponds to an example of a target angle of the vehicle body frame angle.

Figure 7:
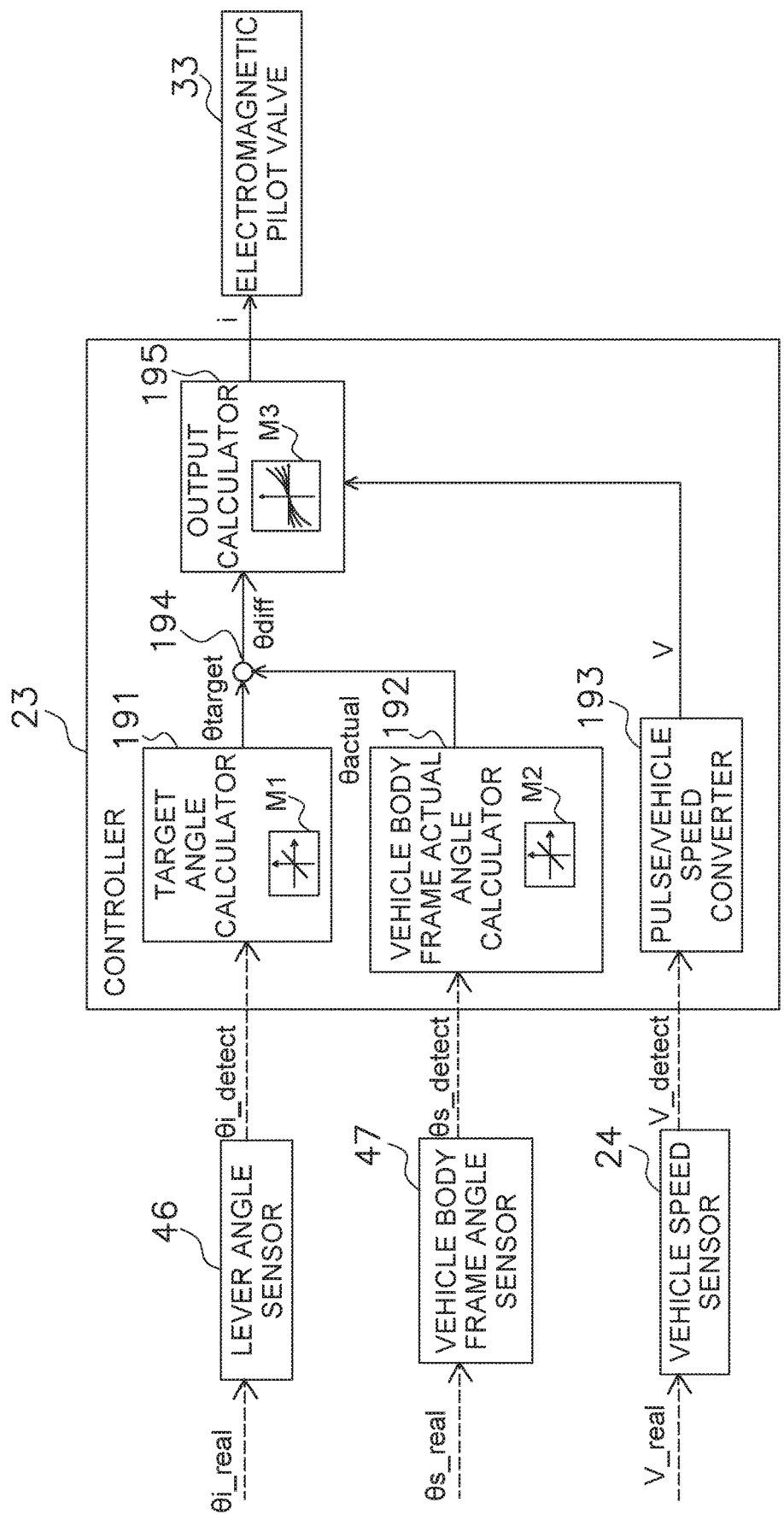
FIG. 7 is a block diagram illustrating input/output and calculation of the controller of FIG. 3.

FIG. 7 is a control block diagram illustrating input/output and calculation of the controller 23.

The controller 23 has a target angle calculator 191, a vehicle body frame actual angle calculator 192, a pulse/vehicle speed converter 193, a difference calculator 194, and an output calculator 195.

The detection value θi_detect of the lever input angle is input to the controller 23 from the lever angle sensor 46, and the target angle calculator 191 calculates the vehicle body frame target angle θtarget using the map M1. Further, the detection value θs_detect of the vehicle body frame angle is input to the controller 23 from the vehicle body frame angle sensor 47, and the vehicle body frame actual angle calculator 192 calculates the vehicle body frame actual angle θactual using the map M2. The detection value V_detect of the vehicle speed is input to the controller 23 from the vehicle speed sensor 24. The pulse/vehicle speed converter 193 converts the input pulse into a vehicle speed and calculates a vehicle speed signal V.

The difference calculator 194 calculates a difference angle θdiff between the vehicle body frame target angle θtarget and the vehicle body frame actual angle θactual. Then, the output calculator 195 calculates an electromagnetic pilot valve control current output i from the difference angle θdiff and the vehicle speed signal V using the map M3 and outputs the electromagnetic pilot valve control current output i to the electromagnetic pilot valve 33 to control the electromagnetic pilot valve 33 so that θdiff becomes zero. The maps M1 to M3 are stored in a storage part of the controller 23.

Figure 8A:
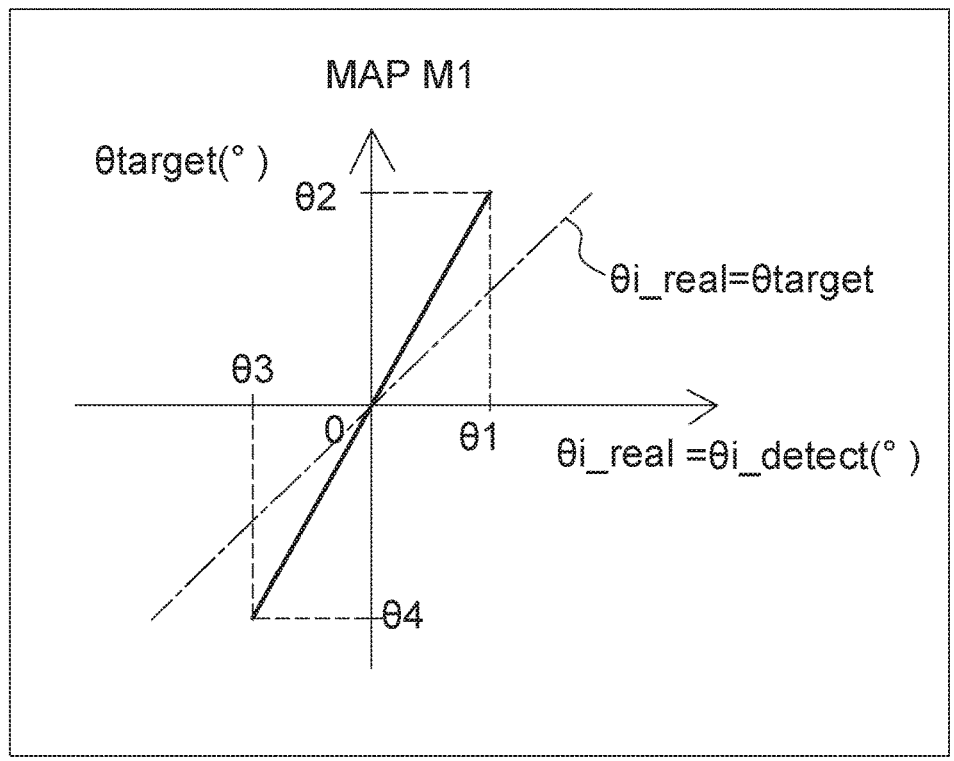
FIG. 8A is a view illustrating a map of FIG. 7.

FIG. 8A is a view illustrating an example of the map M1. The map M1 illustrates the relationship between the actual lever input angle θi_real and the vehicle body frame target angle θtarget. The vehicle body frame target angle θtarget corresponding to the maximum value of the vehicle body frame actual angle θs_real is set to θ2. At this time, the vehicle body frame 2 is in the most bent state to the right. The lever input angle θi_real corresponding to θ2 is set to θ1. By setting the relationship of θ1<θ2, it becomes possible to steer at a lever input angle θi_real smaller than the vehicle body frame actual angle θs_real, and it is possible to reduce operator's fatigue.

Further, the vehicle body frame target angle θtarget corresponding to the minimum value of the vehicle body frame actual angle θs_real is set to θ4. At this time, the vehicle body frame 2 is in the most bent state to the left. The lever input angle i_real corresponding to θ4 is θ3. By setting the relationship of θ4<θ3, it becomes possible to steer at a lever input angle θi_real smaller than the vehicle body frame actual angle θs_real, and it is possible to reduce operator's fatigue.

Furthermore, the characteristics of the actual lever input angle θi_real and the vehicle body frame target angle θtarget on the left and right need not be symmetrical because the human movements to the left and right is not symmetrical.

Figure 8B:
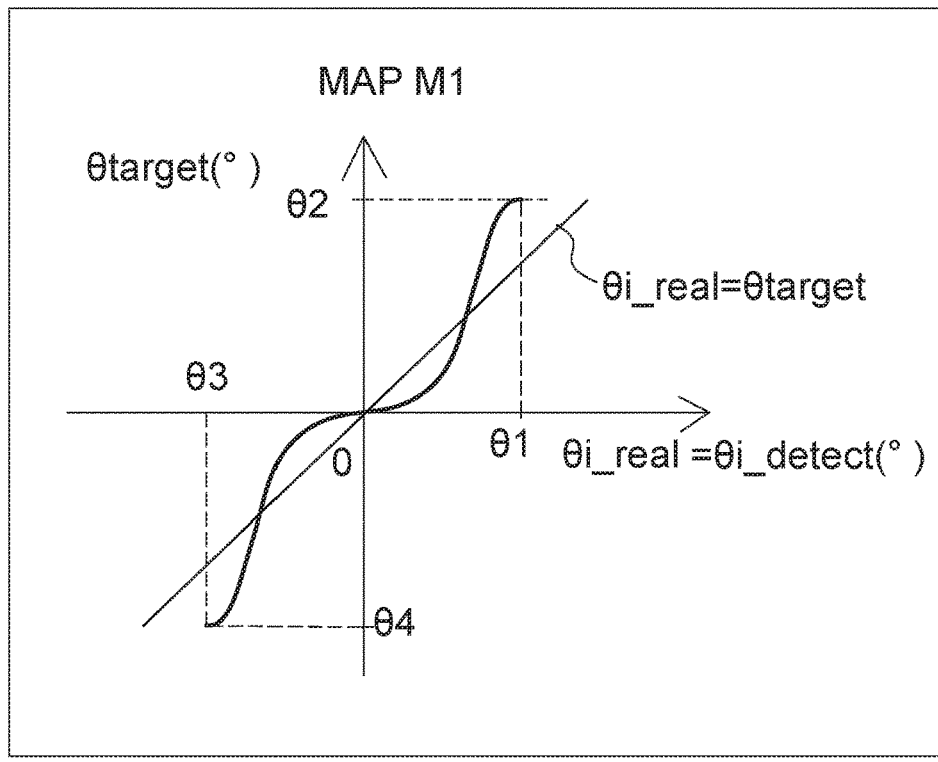
FIG. 8B is a view illustrating another example of the map of FIG. 8A.
Figure 8C:
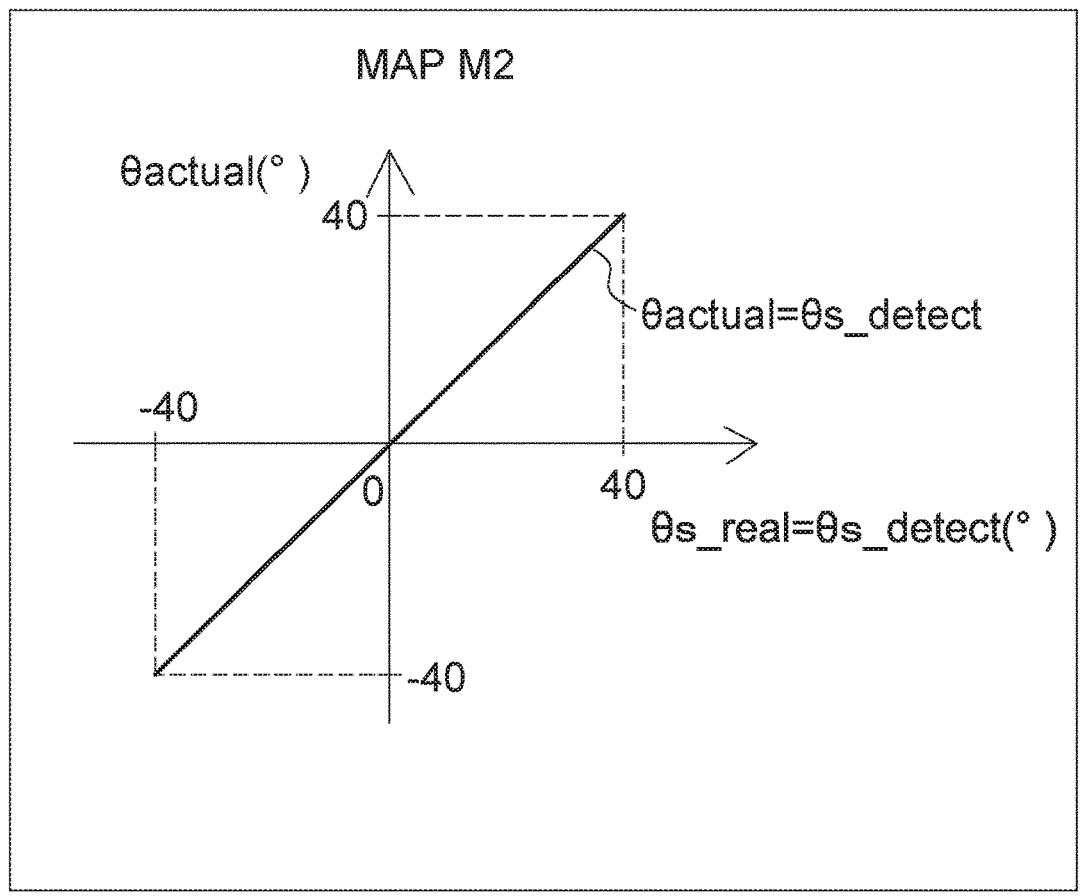
FIG. 8C is a view illustrating a map of FIG. 7.

FIG. 8B is a view illustrating another example of the map M1. The relationship between the lever input angle θi_real and the vehicle body frame target angle θtarget is a curve in which the slope (increase rate) is small when the lever input angle θi_real is near zero and the slope is large when the lever input angle θi_real is far from zero. When traveling at high speeds, near zero is used, and when working, the entire range of the lever angle is used. Therefore, by setting the characteristics as illustrated in FIG. 8B, it is possible to achieve both straight traveling stability during high-speed traveling and fatigue reduction during work FIG. 8C is a view illustrating an example of the map M2. An example of the map M2 illustrated in FIG. 8C shows a graph of the relationship between the detection value θs_detect of the vehicle body frame angle and the vehicle body frame actual angle θactual. In this example, the detection value θs_detect of the vehicle body frame angle and the vehicle body frame actual angle θactual have a proportional relationship. The controller 23 calculates the vehicle body frame actual angle θactual from the detection value θs_detect of the vehicle body frame angle by using this map M2. The vehicle body frame actual angle θactual indicates the actual angle of the vehicle body frame angle. Further, in the map M2 of FIG. 8C, θactual=1×θs_detect is set and the value of θactual and the value of θs_detect are equal, but the present invention is not limited to this.

Figure 8D:
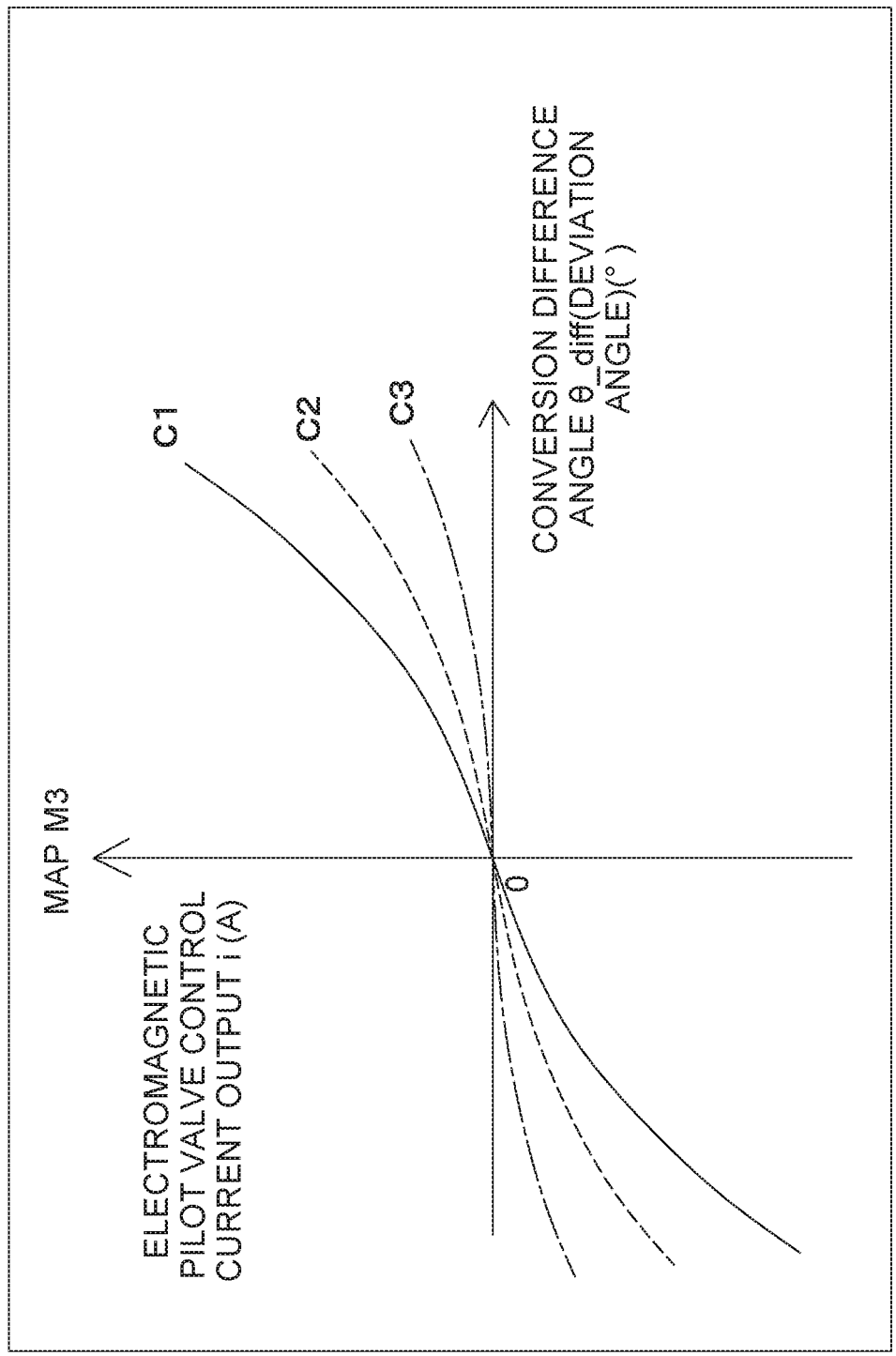
FIG. 8D is a view illustrating a map of FIG. 7.

FIG. 8D is a view illustrating an example of the map M3. The controller 23 stores curves about a plurality of vehicle speeds illustrating the value of the electromagnetic pilot valve control current output i with respect to the difference angle θdiff. In the example of the map M3 illustrated in FIG. 8D, for example, a curve C1 (solid line) when the vehicle speed is 10 km/h, a curve C2 (dotted line) when the vehicle speed is 20 km/h, and a curve C3 (one-dot chain line) when the vehicle speed is 30 km/h are set. The faster the vehicle speed, the smaller the value of the electromagnetic pilot valve control current output i. As a result, as the vehicle speed increases, the speed at which the vehicle body frame actual angle θs_real changes (also referred to as angular velocity) decreases, and it is possible to improve high-speed stability. Further, as the vehicle speed decreases, the speed at which the vehicle body frame actual angle θs_real changes (also referred to as angular velocity) increases, and it is possible to improve the operability at low speed. When the vehicle speed V is between C1, C2 and C3, the electromagnetic pilot valve control current output i is determined by interpolation calculation.

The controller 23 transmits an electric current to the electromagnetic pilot valve 33 based on FIG. 8D.

Although omitted in FIG. 3, the controller 23 may control the main pump 32, the pilot pump 34, and the like.

Further, the transmission and reception of signals between the controller 23 and the vehicle body frame angle sensor 47, the lever angle sensor 46, the vehicle speed sensor 24, and the electromagnetic pilot valve 33 may each be carried out wirelessly or by wire.

(Transmission Mechanism 10)

The transmission mechanism 10 transmits information on the vehicle body frame actual angle θs_real to the base member 43, and rotates the base member 43 to a position corresponding to the vehicle body frame actual angle θs_real.

FIG. 9A is a schematic view illustrating the configuration of the transmission mechanism 10. As illustrated in the figure, the transmission mechanism 10 is a mechanism including links, and has a transmission member 91, a first conversion part 92, a universal joint 93, a bevel box 94, a universal joint 95, and a transmission part 96.

FIG. 9B is a rear view illustrating the configuration in the vicinity of the transmission member 91.

The transmission member 91 is a rod-shaped member and is arranged substantially along the front-rear direction X. A front end 91a of the transmission member 91 is rotatably connected to a bracket 98 fixed to the front frame 11. The end 91a of the transmission member 91, which is a connection part with the bracket 98, is arranged near the coupling shaft part 13 in the vehicle width direction Y. A rear end 91b of the transmission member 91 extends to the rear frame 12 and is rotatably connected to a lever 92a of the first conversion part 92.

The first conversion part 92 converts the movement of the transmission member 91 in the front-rear direction X into movement in the rotation direction. The first conversion part 92 has the lever 92a, a rotation shaft 92b, and a shaft support part 92c. The rotation shaft 92b is arranged substantially along the vertical direction. The shaft support part 92c rotatably supports the rotation shaft 92b. The shaft support part 92c is fixed to the rear frame 12 and arranged on the floor of the cab 5. The lever 92a is fixed to the lower end of the rotation shaft 92b, and at least a part of the lever 92a is arranged under the floor of the cab 5. That is, the rotation shaft 92b penetrates the floor of the cab 5. Further, as illustrated in FIG. 9B, a quadrangle connecting the coupling shaft part 13, the end 91a, the end 91b and the rotation shaft 92b is a parallelogram, and a parallel link is formed.

The universal joint 93 is expandable and contractable, and is connected to the rotation shaft 92b. The lower end 93a of the universal joint 93 is connected to the upper end of the rotation shaft 92b. The upper end 93b of the universal joint 93 is connected to the bevel box 94.

The bevel box 94 is arranged inside the console box 20, for example. The bevel box 94 has a support case 94a, a first rotation shaft 94b, a first bevel gear 94c, a second rotation shaft 94d, and a second bevel gear 94e. The support case 94a is fixed to the console box 20. The first rotation shaft 94b is rotatably supported by the support case 94a. The first rotation shaft 94b is arranged substantially along the vertical direction, and the lower end of the first rotation shaft 94b is connected to the upper end 93b of the universal joint 93.

The first bevel gear 94c is arranged inside the support case 94a and is fixed to the first rotation shaft 94b.

The second rotation shaft 94d is rotatably supported by the support case 94a. The second rotation shaft 94d is arranged substantially along the horizontal direction. The universal joint 95 is connected to the front end of the second rotation shaft 94d.

The second bevel gear 94e is arranged inside the support case 94a and is fixed to the second rotation shaft 94d. The second bevel gear 94e meshes with the first bevel gear 94c. With such a bevel box 94, it is possible to convert the rotation about the vertical direction into the rotation about the horizontal direction.

The universal joint 95 is expandable and contractable, and is arranged inside the console box 20. The rear end 95a of the universal joint 95 is connected to the second rotation shaft 94d. The front end 95b of the universal joint 95 is connected to the transmission shaft 96b of the transmission part 96.

The transmission part 96 transmits the rotation of the universal joint 95 to the base member 43. The transmission part 96 has a transmission shaft 96b, and a transmission gear 96c. The transmission shaft 96b is rotatably supported by the support part 42 of the operation unit 25, as illustrated in FIG. 4A. The transmission shaft 96b is arranged substantially along the horizontal direction. The rear end of the transmission shaft 96b is connected to the front end 95b of the universal joint 95 as illustrated in FIG. 9A. The transmission gear 96c is fixed to the transmission shaft 96b inside the shaft support part 96a.

As illustrated in FIG. 4C, the transmission gear 96c meshes with the transmission gear portion 74 of the base member 43.

When the front frame 11 is rotated in the right direction (arrow Yr in the rear view of FIG. 9B) as illustrated by the two-dot chain line, the bracket 98 is also rotated, and the transmission member 91 is also moved forward (arrow C1). Then, the lever 92a also rotates in the right direction (arrow C2) when viewed from above, and the universal joint 93 also rotates in the right direction. The rotation of the universal joint 93 is converted by the bevel box 94 into the rotation of the left direction (arrow C3) when viewed from the rear, and the transmission shaft 96b and the transmission gear 96c also rotate in the left direction through the universal joint 95 when viewed from the rear. As a result, the transmission gear portion 74 rotates in the right direction (arrow C4) when viewed from the rear, so that the base member 43 also rotates in the right direction.

When the front frame 11 rotates in the left direction, the bracket 98 moves rearward, and the lever 92a and the universal joint 93 rotate in the left direction when viewed from above. Due to the rotation of the universal joint 93, the universal joint 95, the transmission shaft 96b, and the transmission gear 96c are also rotated in the right direction through the bevel box 94 when viewed from the rear. As a result, the transmission gear portion 74 rotates in the left direction when viewed from the rear, and the base member 43 also rotates in the left direction.

Here, the reduction ratio from the transmission gear 96c to the transmission gear portion 74 is set so as to match the reciprocal of the inclination of the map M1 illustrated in FIG. 8A. For example, in the case of $\theta i\_real=0.5\times\theta target$, the reciprocal of the inclination is set to 2. When the body frame angle $\theta s\_real$ of the front frame 11 with respect to the rear frame 12 is 40 degrees, the base angle $\theta b\_real$ of the base member 43 with respect to the support part 42 is set to be 20 degrees. As a result, the scales of the rotation angles of the base member 43 and the joystick lever 41 with respect to the support part 42 can be matched.

When the map M1 is a curve as illustrated in FIG. 8B, the same relationship is realized by using an unequal pitch gear.

The base member 43, the biasing part 44, the transmission mechanism 10 and the like described above constitute a counterforce applying mechanism 26 that applies a counterforce to the operation of the lever portion 51.

Operation

Figure 10:
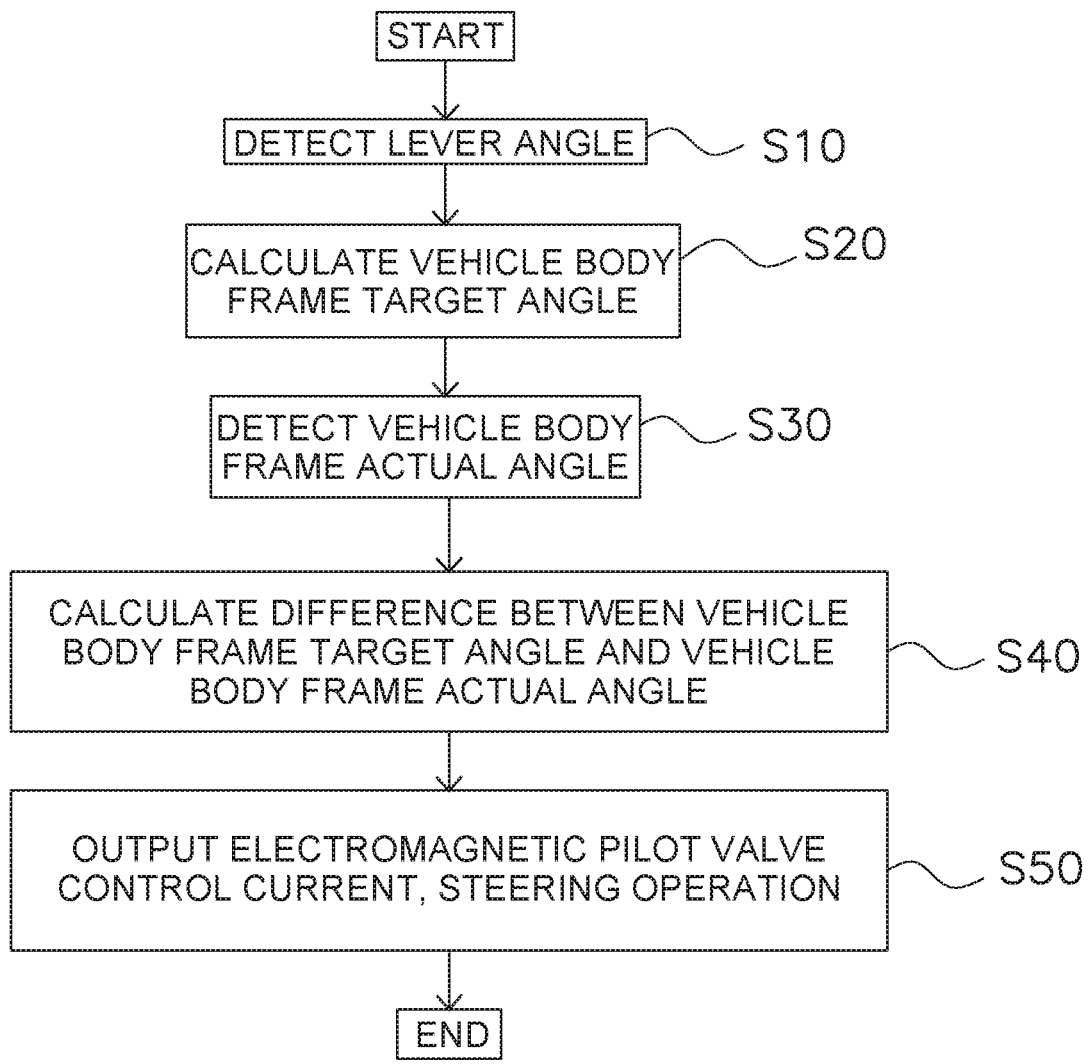
FIG. 10 is a flowchart illustrating a control operation of the wheel loader in FIG. 1.
Figure 11C:
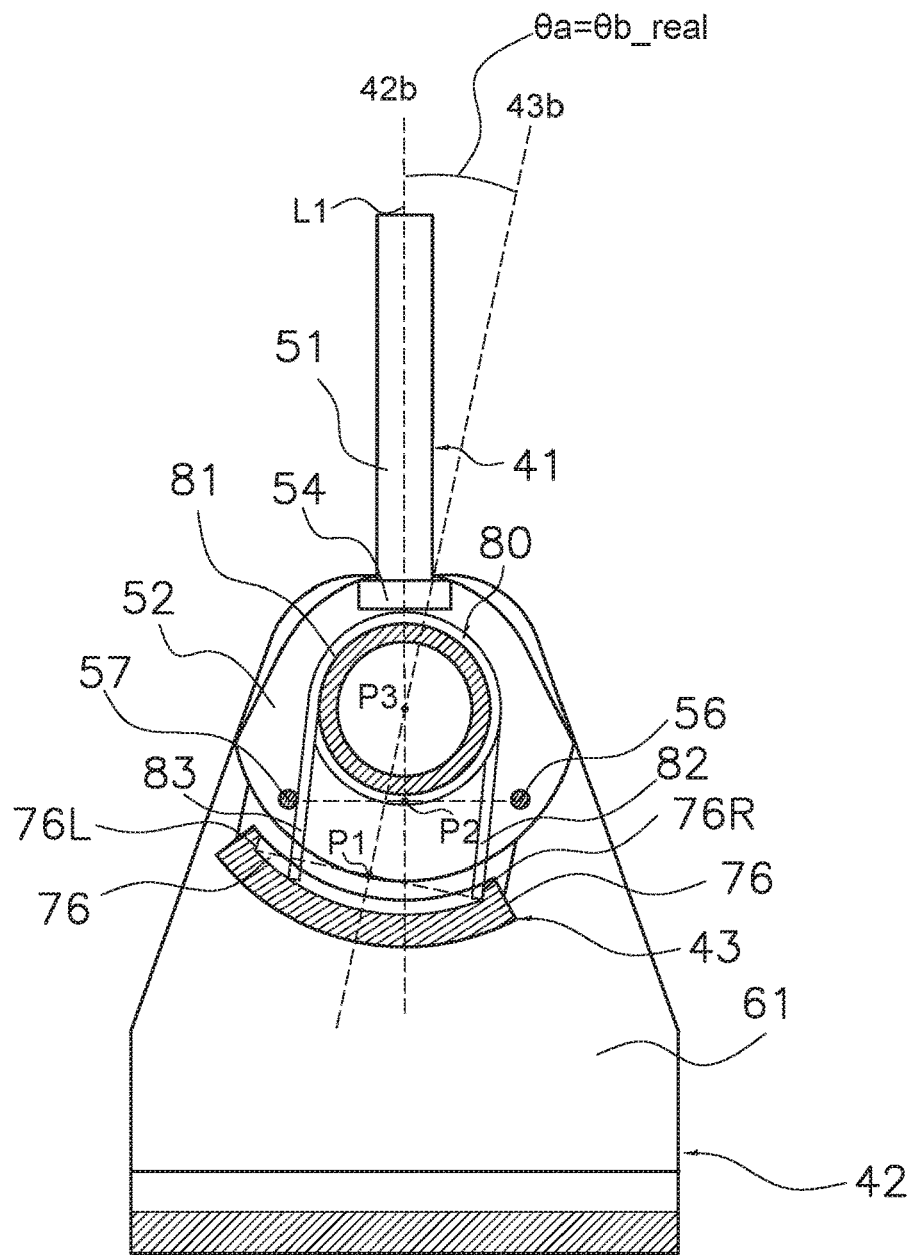
FIG. 11C is a view for explaining the control operation of the wheel loader of FIG. 1.

The control operation of the wheel loader 1 according to the present embodiment will be described below. FIG. 10 is a flow chart illustrating the control operation of the wheel loader 1 of the present embodiment. FIGS. 11A to 11C are sectional views for explaining the control operation of the wheel loader 1 of the present embodiment.

As illustrated in FIG. 4D, in the case where the base reference position 43b of the base member 43 matches the support reference position 42b of the support part 42, and the longitudinal direction (L1) of the joystick lever 41 also matches the support reference position 42b (also referred to as an initial position.), the actual lever input angle $\theta i\_real$ by the joystick lever 41 is zero.

At this time, the electromagnetic pilot valve 33 is in the neutral position. In this case, the hydraulic valve 31 is also in the neutral position. Therefore, the oil is not supplied to or discharged from the left and right steering cylinders 9a and 9b, and the actual vehicle body frame angle $\theta s\_real$ is maintained at zero. In this way, since the vehicle body frame actual angle $\theta s\_real$ is also zero, the base member 43 is also located at the initial position.

Then, the operator applies an operating force Fin to rotate the joystick lever 41 from the support reference position 42b to the right side. When the operating force Fin exceeds the initial biasing force of the spring member 80 the lever portion 51 rotates in the right direction and the actual lever input angle $\theta i\_real$ increases, as illustrated in FIG. 11A. Further, the counterforce applied by the spring member 80 increases as the lever portion 51 is moved to the right direction.

In step S10, the lever angle sensor 46 detects the actual lever input angle $\theta i\_real$ of the lever portion 51 operated by the operator as illustrated in FIG. 3 as the detection value $\theta i\_detect$ of the lever input angle.

Next, in step S20, the controller 23 calculates the vehicle body frame target angle $\theta target$ from the detection value $\theta i\_detect$ of the lever input angle by using the map M1 as illustrated in FIG. 7.

Next, in step S30, the vehicle body frame angle sensor 47 detects the vehicle body frame actual angle $\theta s\_real$ as the detection value $\theta s\_detect$ of the vehicle body frame angle, and calculates the vehicle body frame actual angle $\theta actual$ by using the map M2 as illustrated in FIG. 7.

At this time, the body frame actual angle $\theta s\_real$ is zero due to the delay in the reaction of the left and right steering cylinders 9a and 9b. Therefore, the detection value $\theta s\_detect$ of the vehicle body frame angle, which is the detection value by the vehicle body frame angle sensor 47, is zero. Since the body frame actual angle $\theta s\_real$ is almost zero, the base member 43 is also not rotating. Therefore, as illustrated in FIG. 11A, when the lever portion 51 is rotated in the right direction, the straight line L1 along the longitudinal direction of the lever portion 51 is rotated from the base reference position 43b.

Further, the first end portion 82 of the spring member 80 is pushed and moved in the clockwise direction (left direction Y1 side) by the connecting member 56, and the tip end of the first end portion 82 is separated from the right end 76R of the groove 76 in the left direction Y1 side. Further, since the tip end of the second end portion 83 is in contact with the left end 76L of the groove 76, the second end portion 83 cannot move in the clockwise direction (left direction Y1 side), and the connecting member 57 is separated from the second end portion 83 in the left direction Y1 side. Accordingly, since the first end portion 82 of the spring member 80 pushes the connecting member 56 in the counterclockwise direction, the spring member 80 biases the joystick lever 41 so that the lever portion 51 returns to the base reference position 43b.

Next, in step S40, the controller 23 calculates a difference angle $\theta diff$ between the body frame target angle $\theta target$ and the body frame actual angle $\theta actual$.

Next, in step S50, the controller 23 uses the calculated difference angle $\theta diff$ and the vehicle speed signal V calculated from the vehicle speed sensor 24 to determine the electromagnetic pilot valve control current output i from the stored map M3 illustrated in FIG. 8D and give a command to the electromagnetic pilot valve 33.

Since the lever portion 51 is rotated in the right direction, the electromagnetic pilot valve 33 is in the right pilot position, and the pilot pressure controlled by the electromagnetic pilot valve 33 is supplied to the hydraulic valve 31. By supplying the pilot pressure, the hydraulic valve 31 is in the right steering position, and the main hydraulic pressure is supplied to the steering cylinders 9a and 9b so as to extend the steering cylinder 9a and contract the steering cylinder 9b.

As a result, the vehicle body frame actual angle θs_real gradually increases, and the front frame 11 is oriented in the right direction with respect to the rear frame 12.

This change in the vehicle body frame actual angle θs_real is reflected on the angle of the base plate 71 via the transmission mechanism 10. As a result, the base plate 71 rotates clockwise (in the direction of arrow H) in FIG. 11A about the center P3 of the rotating shaft 64. When the base plate 71 is rotated toward the rotating position of the lever portion 51, the deviation angle between the actual lever input angle θi_real and the actual base angle θb_real becomes small, so the biasing force of the spring member 80 becomes small.

As illustrated in FIG. 11A, when the operator stops the lever portion 51 at a predetermined actual lever input angle θi_real=θa, the difference angle θdiff becomes smaller because the vehicle body frame actual angle θs_real gradually increases. Then, when the vehicle body frame actual angle θs_real catches up with the vehicle body frame target angle θa_target obtained by converting the lever input angle θa using the map M1 of FIG. 8A, the difference angle θdiff becomes zero. At this time, the electromagnetic pilot valve 33 is in the neutral position, and the hydraulic valve 31 is also in the neutral position. Therefore, the oil is not supplied to or discharged from the left and right steering cylinders 9a and 9b, and the vehicle body frame actual angle θs_real maintains the vehicle body frame target angle θa_target obtained by converting the lever input angle θa using the map M1 in FIG. 8A. Further, as illustrated in FIG. 11B, the base member 43 also rotates clockwise by θa, and the straight line L1 passing through the center of the lever portion 51 is arranged at the base reference position 43b. The positional relationship between the base member 43 and the joystick lever 41 is the same as that in the state illustrated in FIG. 4D.

Next, when the operator returns the lever portion 51 from the right side position (θi_real=θa) toward the central position (θi_real=zero), the joystick lever 41 rotates in the left direction so that the straight line L1 is positioned in the vertical direction (support reference position 42b) as illustrated in FIG. 11C.

Before returning the lever portion 51 to the support reference position 42b (state illustrated in FIG. 11B), the positional relationship between the joystick lever 41 and the base member 43 is the same as that in FIG. 4D. Therefore, the counterforce at the start movement when moving the lever portion 51 is the same as the counterforce at the start movement from the initial position. That is, in the present embodiment, since the base member 43 rotates to the position corresponding to the vehicle body frame actual angle θs_real, the counterforce applied to the operation is determined according to the state of the electromagnetic pilot valve 33 (intermediate position, right pilot position, left position) regardless of the position of the lever portion 51.

At this time, the body frame actual angle θs_real is in the state of θa_target due to the delay in the reaction of the left and right steering cylinders 9a and 9b. Further, since the actual base angle θb_real is θa, in which is the same as the vehicle body frame actual angle θs_real, the second end portion 83 of the spring member 80 is pushed by the connecting member 57 and is rotated counterclockwise (the right direction Yr side) to be separated from the left end 76L of the groove 76 as shown in FIG. 11C.

On the other hand, the first end portion 82 of the spring member 80 presses the right end 76R of the groove 76. As a result, the second end portion 83 of the spring member 80 pushes the connecting member 57 in the clockwise direction, so that the spring member 80 biases the joystick lever 41 with respect to the base plate 71 so as to be in the state of FIG. 11B.

As described above, since the actual body frame actual angle θs_real is in the state of θa_target, the difference angle θdiff decreases from zero and becomes negative. Then, the electromagnetic pilot valve 33 is in the left pilot position, the pilot pressure is supplied to the hydraulic valve 31, and the hydraulic valve 31 is in the left steering position. As a result, the hydraulic pressure is supplied so that the steering cylinder 9b extends and the steering cylinder 9a contracts.

As a result, the vehicle body frame actual angle θs_real gradually decreases from the rotation angle θa_target. This change in the vehicle body frame actual angle θs_real is reflected on the base member 43 via the transmission mechanism 10 as described above, and the base member 43 also rotates in the same manner as the change in the vehicle body frame actual angle θs_real.

Then, when the vehicle body frame actual angle θs_real becomes zero, the difference from the actual lever input angle θi_real (=0) becomes zero. At this time, the electromagnetic pilot valve 33 is in the neutral position, and the hydraulic valve 31 is also in the neutral position. Therefore, the oil is not supplied to or discharged from the left and right steering cylinders 9a and 9b, and the vehicle body frame actual angle θs_real returns to zero and is maintained. As a result, the front frame 11 is returned to the direction that is the direction along the front-rear direction with respect to the rear frame 12.

Furthermore, the base member 43 is rotated by the transmission mechanism 10 so that the actual base angle θb_real becomes zero as the vehicle body frame actual angle θs_real decreases, and returns to the initial position (θb_real=0) as illustrated in FIG. 4D.

Further, the control operation when the joystick lever 41 is rotated to the left is the same as the above, and therefore is omitted.

Embodiment 2

Next, the wheel loader 201 of the second embodiment according to the present invention will be described. Unlike the steering system of the first embodiment, the wheel loader 201 of the second embodiment does not have the transmission mechanism 10. In the second embodiment, the same configurations as those in the first embodiment are designated by the same reference numerals as those in the first embodiment, and the description thereof will be omitted.

Figure 12:
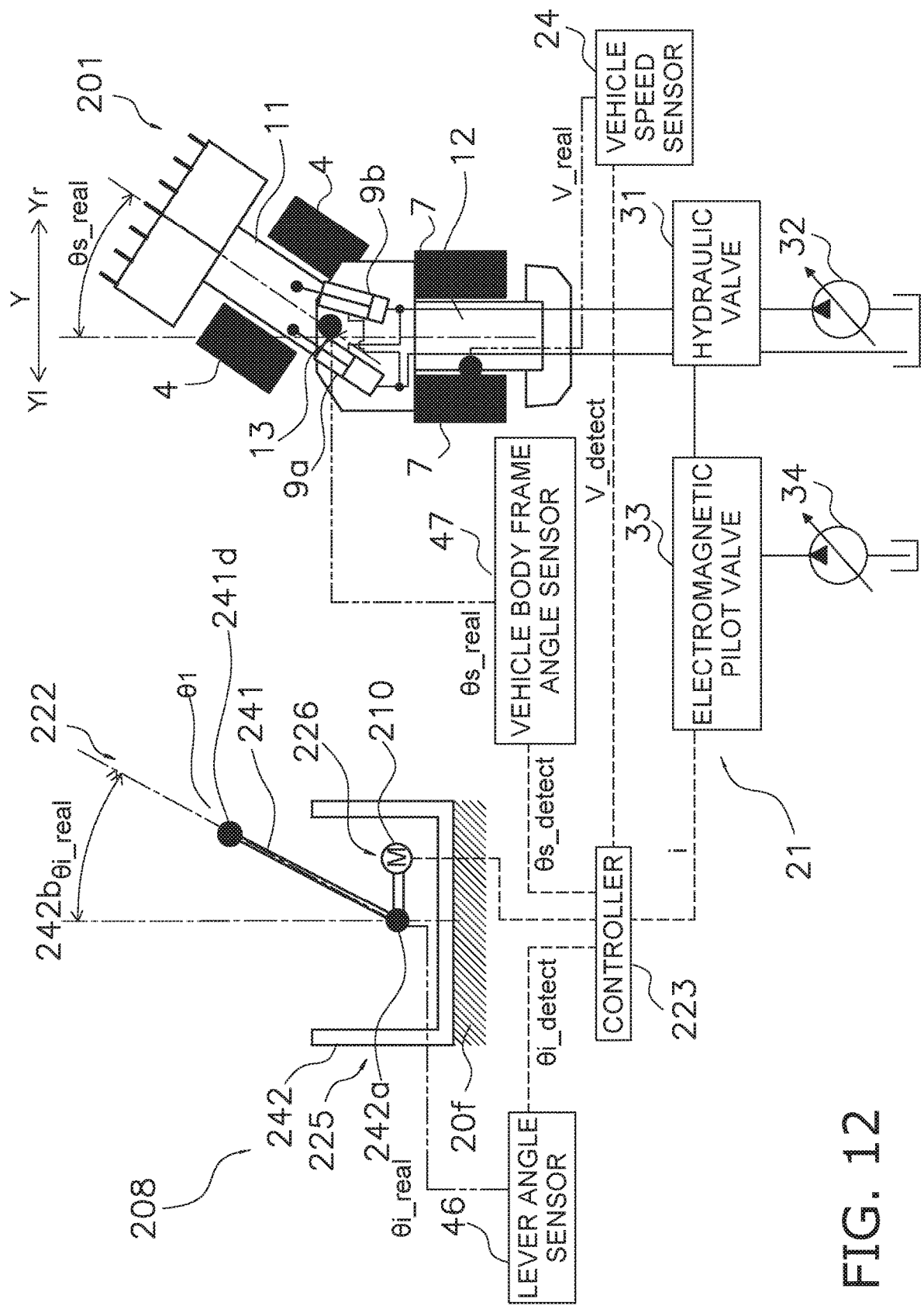
FIG. 12 is a configuration view illustrating a steering system of a wheel loader according to a second embodiment of the present invention.

FIG. 12 is a view illustrating the configuration of the steering system 208 of the wheel loader 201 according to the second embodiment.

The steering system 208 according to the second embodiment has the adjusting mechanism 21, the steering device 222, the controller 223, and the vehicle speed sensor 24. The controller 223 corresponds to an example of a controller. In FIG. 12, transmission of signals based on electricity is indicated by dotted lines, and transmission based on hydraulic pressure is indicated by solid lines. Further, the detection by the sensor is illustrated by a two-dot chain line.

The steering device 222 has an operation unit 225, a lever angle sensor 46, and a vehicle body frame angle sensor 47. The operation unit 225 has a joystick lever 241, a support part 242 that rotatably supports the joystick lever 241, and a counterforce applying mechanism 226 that applies a counterforce to the operation of the joystick lever 241.

The joystick lever 241 has, for example, a through hole at the proximal end, and the shaft 242a of the support part 242 is inserted through the through hole. With such a configuration, the joystick lever 241 can be rotatably supported by the support part 242.

The counterforce applying mechanism 226 applies a counterforce to the rotating operation of the joystick lever 241 from the support reference position 242b. The counterforce applying mechanism 226 has an electric motor 210. For example, a gear is fixed to the output shaft of the electric motor 210, and the gear meshes with a gear shape formed on the outer periphery of the proximal end of the joystick lever 241, whereby a counterforce can be applied to the operation of the joystick lever 241.

The controller 223 has a CPU, a memory, and the like. The similarly to the controller 23 of the first embodiment, the detection value $\theta i\_detect$ by the lever angle sensor 46, the detection value $\theta s\_detect$ by the vehicle body frame angle sensor 47, and the detection value $\theta i\_detect$ by the vehicle speed sensor 24 are input to the controller 223, and the controller 223 controls the electromagnetic pilot valve 33 based on these values.

As illustrated in FIG. 7, the controller 223 calculates the vehicle body frame target angle $\theta target$ from the detection value $\theta i\_detect$ of the lever input angle detected by the lever angle sensor 46 by using the map M1 illustrated in FIG. 8A, calculates the vehicle body frame actual angle $\theta actual$ from the detection value $\theta s\_detect$ of the vehicle body frame angle by using the map M2, and calculates the difference angle $\theta diff$.

Then, the controller 223 determines the electromagnetic pilot valve control current output i transmitted to the electromagnetic pilot valve 33 based on the calculated difference angle $\theta diff$ and the vehicle speed V detected by the vehicle speed sensor 24 from the stored graph of FIG. 8D Further, the controller 223 applies a counterforce to the operation of the joystick lever 241 based on the value of $\theta diff$. For example, a counterforce characteristic such as a graph in which $\theta r\_real$ on the horizontal axis of FIG. 5 is replaced by $\theta diff$ can be added. That is, the controller 223 sends a command to the electric motor 210 so that the counterforce increases as the absolute value of $\theta diff$ increases, and the counterforce decreases as the vehicle body frame target angle $\theta target$ calculated from the lever rotation angle $\theta i\_real$ of the joystick lever 241 approaches the vehicle body frame angle $\theta s\_real$. The command from the controller 223 to the electric motor 210 may be wired or wireless.

Characteristics (1)

The wheel loader 1 or 201 of the first or second embodiment is articulated type work vehicle in which a front frame 11 and a rear frame 12 are coupled to each other, has steering cylinders 9a and 9b, joystick lever 41 or 241, the hydraulic valve 31 and the controller 23 or 223. The steering cylinders 9a and 9b are hydraulically driven to change the vehicle body frame angle $\theta s\_real$ of the front frame 11 with respect to the rear frame 12. The joystick lever 41 or 241 are rotated to change the vehicle body frame angle $\theta s\_real$. The controllers 23 or 223 controls the flow rate of oil supplied to the steering cylinders 9a and 9b. The controller 23 or 223 sets the vehicle body frame target angle $\theta target$ with respect to the input angle $\theta i\_real$ of the joystick lever 41 or 241, and controls the hydraulic valve 31 so that the vehicle body frame actual angle $\theta s\_real$ matches the vehicle body frame target angle $\theta target$. As illustrated in FIGS. 8A and 8B, the absolute value of the vehicle body frame target angle $\theta target$ corresponding to the absolute value of the lever input angle $\theta i\_real$ is at least partially larger than the absolute value of the lever input angle $\theta i\_real$.

In this way, the control is performed so that the vehicle body frame target angle $\theta target$ becomes larger than the absolute value of the input angle $\theta i\_real$ of the joystick lever 41 or 241. As an example, when the input angle $\theta i\_real$ of the joystick lever 41 or 241 is set to 15 degrees, the vehicle body frame target angle can be set to 30 degrees, for example.

Therefore, the operation angle of the joystick lever 41 or 241 can be small, so it is possible to reduce the burden on the operator.

Furthermore, the characteristic of FIG. 8B is mentioned as an example of "partially larger". In the map M1 of FIG. 8B, there is a portion where the absolute value of the lever input angle $\theta i\_real$ and the absolute value of the vehicle body frame target angle $\theta target$ match by the straight line of $\theta i\_real=\theta target$ near zero, but in the vicinity of the absolute value of the vehicle body frame target angle $\theta target$ corresponding to the absolute value of the lever input angle $\theta i\_real$ is larger than the absolute value of the lever input angle $\theta i\_real$.

(2)

The wheel loader 1 or 201 of the first or second embodiment is articulated type work vehicle in which a front frame 11 and a rear frame 12 are coupled to each other, has steering cylinders 9a and 9b, joystick lever 41 or 241, the hydraulic valve 31 and the controller 23 or 223. The steering cylinders 9a and 9b are hydraulically driven to change the vehicle body frame angle $\theta s\_real$ of the front frame 11 with respect to the rear frame 12. The joystick lever 41 or 241 are rotated to change the vehicle body frame angle $\theta s\_real$. The controller 23 or 223 controls the flow rate of oil supplied to the steering cylinders 9a and 9b. The controller 23 or 223 sets the vehicle body frame target angle $\theta target$ with respect to the input angle $\theta i\_real$ of the joystick lever 41 or 241, and control the hydraulic valve 31 so that the vehicle body frame actual angle $\theta s\_real$ matches the vehicle body frame target angle $\theta target$.

As illustrated in FIG. 8B, a value obtained by differentiating the vehicle body frame target angle $\theta target$ by the input angle $\theta i\_real$ of the joystick lever 41 or 241 includes a value larger than 1 and a value smaller than 1.

As a result, it is possible to reduce the burden on the operator.

Furthermore, "a value obtained by differentiating the vehicle body frame target angle $\theta target$ by the input angle $\theta i\_real$ of the joystick lever 41 or 241 includes a value smaller than 1" is illustrated in the map M1 of FIG. 8B as an example. In the vicinity of zero of the map M1 in FIG. 8B, referring to the straight line $\theta i\_real=\theta target$, the value obtained by differentiating the vehicle body frame target angle $\theta target$ by the input angle $\theta i\_real$ of the joystick lever 41 or 241 is smaller than 1. Further, "a value obtained by differentiating the vehicle body frame target angle $\theta target$ by the input angle $\theta i\_real$ of the joystick lever 41 or 241 includes a value larger than 1" is illustrated in the map M1 of FIG. 8B as an example. In the map M1 of FIG. 8B, in the vicinity of the portion intersecting the straight line of $\theta i\_real=\theta target$ the value differentiated by the input angle $\theta i\_real$ of the joystick lever 41 or 241 is larger than 1 (see the straight line of $\theta i\_real=\theta target$).

(3)

In the wheel loader 1 or 201 of the first or second embodiment, the joystick lever 41 or 241 is arranged on the left side of the operator's seat 19, and when the joystick lever 41 or 241 are rotated to the left side, the vehicle body frame actual angle is decreased, and at least the value θ4 of the vehicle body frame target angle θtarget that matches the minimum value of the vehicle body frame actual angle θs_real is smaller than the value θ3 of the corresponding lever input angle θi_real of the joystick lever 41 or 241.

In particular, when the operator operates the joystick lever 41 toward the outside (left side in the present embodiment) with respect to the operator's seat 19, the burden on the wrist is large, so by decreasing the operation angle of the joystick lever 41 toward the outside (left side), it is possible to improve operator fatigue. Furthermore, when the joystick lever 41 or 241 is arranged on the right side of the operator's seat 19, the outside is on the right side.

In the first and second embodiments, the value θ2 of the vehicle body frame target angle θtarget that matches the maximum value of the vehicle body frame actual angle θs_real is the corresponding lever input angle θi_real of the joystick lever 41 or 241 on the inner side (right side), and the operator's fatigue is improved even when the operator operates the joystick lever 41 toward the inside (right side) with respect to the operator's seat 19.

As described above, in the first and second embodiment, the present configuration is used so as to improve the fatigue of the operator regardless of whether the wrist is moved to the left side (outer side) or the right side (inner side). The present configuration may be used for only one side. However, since it is more difficult to operate by turning the wrist to the outside, it is preferable to use this configuration at least on the outside.

Further, in the present embodiment, when the joystick lever 41 or 241 is turned to the left side, the vehicle body frame actual angle θs_real is decreased, and when the joystick lever 41 or 241 is turned to the right side, the vehicle body frame actual angle θs_real is increased. But these may be reversed. In this case, using FIG. 8A, the vehicle body frame actual angle θs_real is increased by rotating the joystick lever 41 or 241 to the left side, and at least the value θ2 of the vehicle body frame target angle θtarget that matches the maximum value of the vehicle body frame actual angle θs_real is larger than the value θ1 of the corresponding lever input angle θi_real of the joystick lever 41, or 241.

(4)

The wheel loader 1 or 201 of the first or second embodiment further has a counterforce applying mechanism 26 or 226. The counterforce applying mechanism 26 or 226 applies a counterforce to the joystick lever 41 toward the lever input angle θi_real corresponding to the vehicle body frame target angle θtarget.

That is, the counterforce applying mechanism 26 or 226 applies the counterforce in the direction of making θdiff zero according to the magnitude of the difference angle θdiff.

As a result, a counterforce corresponding to the difference angle between the vehicle body frame angle θs_real and the vehicle body frame target angle θtarget can be applied to the operation of the joystick lever 41 or 241.

(5)

The wheel loader 1 of the first embodiment further has a support part 42. The support part 42 is arranged inside the cab 5 provided on the rear frame 12. The counterforce applying mechanism 26 has a base member 43, a biasing part 44, and a transmission mechanism 10. The base member 43 is rotatably supported by the support part 42. The biasing part 44 biases the joystick lever 41 to a predetermined position with respect to the base member 43. The transmission mechanism 10 includes a link, transmits the vehicle body frame angle θs_real to the base member 43, and rotates the base member 43 to an angle corresponding to the vehicle body frame angle θs_real. The joystick lever 41 is rotatably supported by the support part 42 or the base member 43.

Accordingly, the biasing part 44 can apply a counterforce to the rotating operation of the joystick lever 41.

(6)

In the wheel loader 1 of the first embodiment, the ratio of the target value of the vehicle body frame angle θs_real to the input angle θi_real of the joystick lever 41 is the reciprocal of the reduction ratio when the vehicle body frame angle θs_real is transmitted to the base member 43 by the transmission mechanism 10.

As a result, the angle scale of the rotation angle of the joystick lever 41 and the angle scale of the rotation angle of the base member 43 can be made to coincide with each other, and a counterforce can be applied by the biasing part 44 according to the deviation angle between the rotation angle of the joystick lever 41 and the vehicle body frame angle.

(7)

In the wheel loader 201 of the second embodiment, the counterforce applying mechanism 226 has the electric motor 210. The electric motor 210 generates a counterforce.

As a result, a counterforce can be applied to the rotating operation of the joystick lever 241 by using the electric motor 210.

OTHER EMBODIMENTS

While an embodiment of the present disclosure has been explained above, the present disclosure is not limited to the above embodiment and various changes are possible within the scope of the present disclosure.

(A)

Figure 13A:
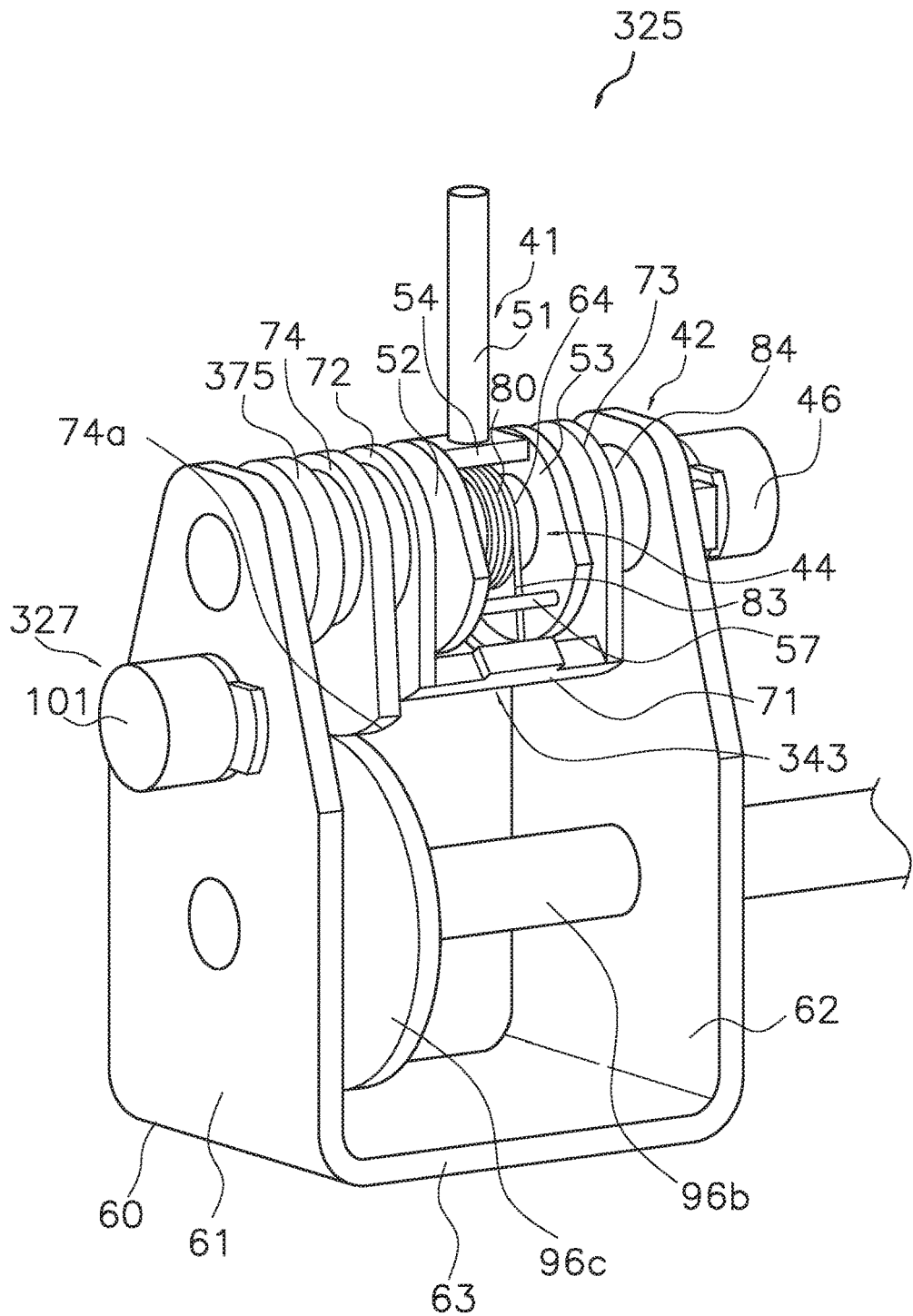
FIG. 13A is a perspective view illustrating an operation unit according to a modified example of the first embodiment of the present invention.
Figure 13B:
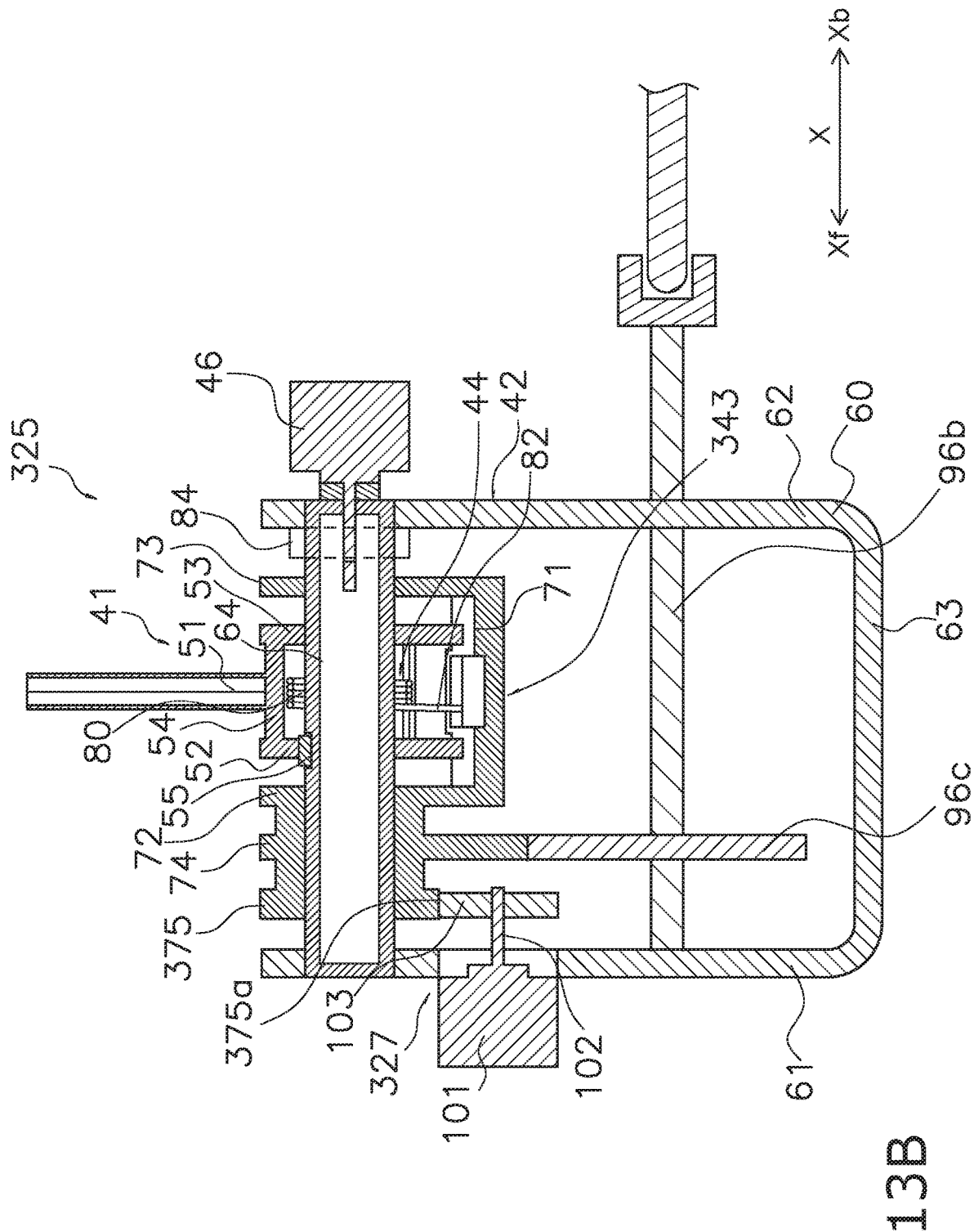
FIG. 13B is a side sectional view of the operation unit of FIG. 13A.

In the first embodiment, the vehicle body frame angle sensor 47 detects the vehicle body frame angle θs_real, but the rotation angle of the base member 43 with respect to the support part 42 may be detected. FIG. 13A is a perspective view illustrating an operation unit 325 including a base angle detection unit 327 that detects the rotation angle of the base member 43. FIG. 13B is a side sectional view of the operation unit 325.

The base member 343 of the operation unit 325 illustrated in FIGS. 13A and 13B further includes a detection gear portion 375 as compared with the base member 43 of the first embodiment. The detection gear portion 375 is used to detect the rotation angle of the base member 43. As illustrated in FIG. 13B, the detection gear portion 375 is arranged on the front direction Xf side of the transmission gear portion 74 and is connected to the transmission gear portion 74. A through hole is formed in the detection gear portion 375 along the front-rear direction X, and the rotating shaft 64 is inserted into the through hole. As a result, the detection gear portion 375 is configured to be rotatable with respect to the rotating shaft 64. The lower end surface 375a of the detection gear portion 375 is formed to be convexly curved downward, and a gear shape is formed on the lower end surface 375a. As illustrated in FIG. 13B, the lower end surface 375a meshes with the gear 103 of the base angle detection unit 327.

As illustrated in FIGS. 13A and 13B, the base angle detection unit 327 has a base member angle sensor 101, a detection shaft 102, and a gear 103.

The base member angle sensor 101 is configured by, for example, a potentiometer, and detects an actual base angle θb_real that is a rotation angle of the base member 43 with respect to the support part 42 (specifically, also referred to as a support frame 60) as the detection value θb_detect of the base member angle. The base member angle sensor 101 is fixed to the outside of the shaft support portion 61.

The detection shaft 102 is an axis whose rotation angle is detected by the base member angle sensor 101. The detection shaft 102 extends from the base member angle sensor 101 to inside the shaft support portion 61 through the shaft support portion 61.

The gear 103 is fixed to the detection shaft 102. The gear 103 meshes with the lower end surface 375a of the detection gear portion 375 of the base member 43.

When the base member 43 is rotated by the transmission mechanism 10 described later, the detection gear portion 375 is also rotated, and the rotation also causes the detection shaft 102 to rotate via the gear 103. The rotation of the detection shaft 102 is detected by the base member angle sensor 101, and the rotation angle of the base plate 71 with respect to the support part 42 is detected.

The base plate angle detection value θb_detect detected by the base member angle sensor 101 is sent to the controller 23 as a detection signal. The controller 23 performs control by using a block diagram in which the detection value θs_detect of the vehicle body frame angle in FIG. 7 is replaced with the detection value θb_detect of the base angle. The controller 23 converts the detection value θb_detect of the base angle by using the map M2 to calculate the vehicle body frame actual angle θactual. Here, since the actual base angle θb_real of the base member 43 corresponds to the vehicle body frame actual angle θs_real by the transmission mechanism 10, by using the map M2 corresponding to the reduction ratio of the transmission mechanism 10 and the detection gear portion 375, the vehicle body frame actual angle θactual can be calculated. The steering cylinders 9a and 9b can be controlled based on the vehicle body frame actual angle θactual as in the first embodiment.

(B)

In the first embodiment described above, the lever angle sensor 46 that detects the lever rotation angle of the joystick lever 41 with respect to the support part 42 and the vehicle body frame angle sensor 47 are provided, and the deviation angle θd_detect is calculated, but the present invention may not be limited to this. For example, an angle sensor that detects the angle of the joystick lever 41 with respect to the base member 43 may be provided. In this case, the difference angle θdiff can be calculated by converting the detection value into the angle scale of the body frame angle, and it is possible to control the steering cylinders 9a and 9b by using the difference angle θdiff as in the first embodiment.

(C)

In the second embodiment described above, the electric motor 210 is used for the counterforce applying mechanism 226 that applies the counterforce to the joystick lever 241, but it is not limited to the electric motor, and a hydraulic motor or the like may be used. In short, any actuator or the like that can generate a counterforce may be used.

(D)

In the first and second embodiments, the amount of oil supplied from the hydraulic valve 31 to the steering cylinders 9a and 9b is controlled according to the pilot pressure input from the electromagnetic pilot valve 33. However, the oil from the electromagnetic pilot valve 33 may be directly supplied to the steering cylinders 9a and 9b without passing through the hydraulic valve 31. That is, an electromagnetic main valve may be used instead of the electromagnetic pilot valve 33.

(E)

In the first embodiment described above, the biasing part 44 is provided with the damper 84 in addition to the spring member 80. However, not limited to the damper, a friction brake may be provided, or the damper or the friction brake may not be provided.

(F)

In the first embodiment, the controllers 23 and 231 perform the calculation using θi_detect=0.5×θtarget, and the inclination is not limited to 0.5, but it is preferable that the inclination is less than 1 because the operator can greatly change the vehicle body frame angle with a small rotation angle. In short, the controllers 23 and 231 may control only need to be able to control the hydraulic valve 31 so that the vehicle body frame target angle θtarget becomes larger than the input angle θi_real of the joystick lever 41.

(G)

In the first and second embodiments described above, the rotation angle of the joystick lever 41 may be electrically or mechanically restricted to less than 70 degrees. In the case of the first embodiment, for example, the support part 42 may be provided with a portion with which the joystick lever 41 comes into contact when the joystick lever 41 is rotated to the left side by 35 degrees and when the joystick lever 41 is rotated to the right side by 35 degrees. Further, in the case of the second embodiment, by restricting the drive of the electric motor 210, the rotation of the joystick lever 41 can be restricted within a predetermined range.

(H)

In the above embodiment, the joystick lever 41 is supported by the support part 42, but may be rotatably supported by the base member 43, or 343.

(I)

While the wheel loader 1 is used in the explanations as an example of the work vehicle in the above embodiments, an articulated type dump truck, a motor grader, or the like may be used.

The work vehicle of the present invention has the effect of reducing the operating angle of the lever, and is useful as a wheel loader or the like.

What is claimed is:

1. A work vehicle, the work vehicle being articulated in which a front frame and a rear frame are coupled, the work vehicle comprising:
   a hydraulic actuator configured to be driven by hydraulic pressure to change a vehicle body frame angle of the front frame with respect to the rear frame;
   a lever configured to be rotated to change the body frame angle;
   a control valve configured to control a flow rate of oil supplied to the hydraulic actuator; and
   a controller configured to
   set a target angle of the vehicle body frame angle with respect to an input angle of the lever and
   control the control valve such that an actual angle of the vehicle body frame angle matches the target angle of the vehicle body frame angle,
   an absolute value of the target value of the vehicle body frame angle corresponding to an absolute value of the input angle of the lever being larger than the absolute value of the input angle of the lever.

2. A work vehicle, the work vehicle being articulated in which a front frame and a rear frame are coupled, the work vehicle comprising:
   a hydraulic actuator configured to be driven by hydraulic pressure to change a vehicle body frame angle of the front frame with respect to the rear frame;

a lever configured to be rotated to change the body frame angle;
a control valve configured to control a flow rate of oil supplied to the hydraulic actuator; and
a controller configured to
set a target angle of the vehicle body frame angle with respect to an input angle of the lever and
control the control valve such that an actual angle of the vehicle body frame angle matches the target angle of the vehicle body frame angle,
values being obtained by differentiating a curve with the input angle of the lever, the values including
a value larger than 1 and
a value smaller than 1,
the curve being a relationship between the target angle of the vehicle body frame angle and the input angle of the lever.

3. The work vehicle according to claim 1, wherein
the target value of the vehicle body frame angle that matches a maximum value of the actual angle of the vehicle body frame angle is larger than the input angle of the lever corresponding to the target value, or
the target value of the vehicle body frame angle that matches a minimum value of the actual angle of the vehicle body frame angle is smaller than the input angle of the lever corresponding to the target value.

4. The work vehicle according to claim 3, wherein
the lever is arranged on a left side of an operator's seat,
when the actual angle of the vehicle body frame angle is increased by rotating the lever to a right side, at least the target angle of the vehicle body frame angle that matches the maximum value of the actual angle of the vehicle body frame angle is larger than the input angle of the lever corresponding to the target value,
when the actual angle of the vehicle body frame angle is decreased by rotating the lever to a left side, at least the target angle of the vehicle body frame angle that matches the minimum value of the actual angle of the vehicle body frame angle is smaller than the input angle of the lever corresponding to the target value.

5. The work vehicle according to claim 1, further comprising:
a counterforce applying mechanism configured to apply a counterforce to the lever toward the input angle of the lever corresponding to the target angle of the vehicle body frame angle.

6. The work vehicle according to claim 5, further comprising:
a support part arranged in a cab provided on the rear frame,
the counterforce applying mechanism including
a base member rotatably supported by the support part,
a biasing part configured to bias the lever to a predetermined position with respect to the base member, and
a transmission mechanism including a link, the transmission mechanism being configured to transmit the vehicle body frame angle to the base member, and the transmission mechanism being configured to rotate the base member at an angle corresponding to the vehicle body frame angle, and
the lever being rotatably supported by the support part or the base member.

7. The work vehicle according to claim 6, wherein
a value of the ratio of the target value of the vehicle body frame angle to the input angle of the lever is a reciprocal of a reduction ratio when transmitting the vehicle body frame angle to the base member by the transmission mechanism.

8. The work vehicle according to claim 5, wherein
the counterforce applying mechanism includes an electric motor configured to generate the counterforce.

9. The work vehicle according to claim 1, wherein
a rotation angle of the lever is electrically or mechanically restricted to less than 70 degrees.

10. The work vehicle according to claim 1, wherein
the work vehicle is a wheel loader.

11. The work vehicle according to claim 2, wherein
the target value of the vehicle body frame angle that matches a maximum value of the actual angle of the vehicle body frame angle is larger than the input angle of the lever corresponding to the target value, or
the target value of the vehicle body frame angle that matches a minimum value of the actual angle of the vehicle body frame angle is smaller than the input angle of the lever corresponding to the target value.

12. The work vehicle according to claim 11, wherein
the lever is arranged on a left side of an operator's seat,
when the actual angle of the vehicle body frame angle is increased by rotating the lever to a right side, at least the target angle of the vehicle body frame angle that matches the maximum value of the actual angle of the vehicle body frame angle is larger than the input angle of the lever corresponding to the target value,
when the actual angle of the vehicle body frame angle is decreased by rotating the lever to a left side, at least the target angle of the vehicle body frame angle that matches the minimum value of the actual angle of the vehicle body frame angle is smaller than the input angle of the lever corresponding to the target value.

13. The work vehicle according to claim 2, further comprising:
a counterforce applying mechanism configured to apply a counterforce to the lever toward the input angle of the lever corresponding to the target angle of the vehicle body frame angle.

14. The work vehicle according to claim 13, further comprising:
a support part arranged in a cab provided on the rear frame,
the counterforce applying mechanism including
a base member rotatably supported by the support part,
a biasing part configured to bias the lever to a predetermined position with respect to the base member, and
a transmission mechanism including a link, the transmission mechanism being configured to transmit the vehicle body frame angle to the base member, and the transmission mechanism being configured to rotate the base member at an angle corresponding to the vehicle body frame angle, and
the lever being rotatably supported by the support part or the base member.

15. The work vehicle according to claim 14, wherein
a value of the ratio of the target value of the vehicle body frame angle to the input angle of the lever is a reciprocal of a reduction ratio when transmitting the vehicle body frame angle to the base member by the transmission mechanism.

16. The work vehicle according to claim 13, wherein
the counterforce applying mechanism includes an electric motor configured to generate the counterforce.

17. The work vehicle according to claim 2, wherein a rotation angle of the lever is electrically or mechanically restricted to less than 70 degrees.

18. The work vehicle according to claim 2, wherein the work vehicle is a wheel loader.

* * * * *